US012489248B2

(12) United States Patent
Kimura

(10) Patent No.: US 12,489,248 B2
(45) Date of Patent: Dec. 2, 2025

(54) CONNECTOR ASSEMBLY FOR FITTING A FIRST CONNECTOR AND A SECOND CONNECTOR UPON ROTATION OF A LEVER MEMBER

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 397 days.

(21) Appl. No.: 18/150,303

(22) Filed: Jan. 5, 2023

(65) Prior Publication Data

US 2023/0283013 A1 Sep. 7, 2023

(30) Foreign Application Priority Data

Mar. 7, 2022 (JP) ................................ 2022-034194

(51) Int. Cl.

| | |
|---|---|
| ***H01R 13/15*** | (2006.01) |
| ***H01R 13/52*** | (2006.01) |
| ***H01R 13/629*** | (2006.01) |
| ***H01R 13/631*** | (2006.01) |

(52) U.S. Cl.

CPC ....... *H01R 13/62938* (2013.01); *H01R 13/15* (2013.01); *H01R 13/5202* (2013.01); *H01R 13/62944* (2013.01); *H01R 13/631* (2013.01)

(58) Field of Classification Search

CPC .......................... H01R 13/62938; H01R 13/15
USPC .......................................................... 439/157
See application file for complete search history.

(56) References Cited

U.S. PATENT DOCUMENTS

| | | | | |
|---|---|---|---|---|
| 5,207,598 | A * | 5/1993 | Yamada | H01R 12/721 439/157 |
| 2008/0213038 | A1 * | 9/2008 | Miyamoto | H01R 13/62938 403/322.4 |
| 2016/0149342 | A1 * | 5/2016 | Rodriguez | H01R 13/62922 439/157 |
| 2021/0159641 | A1 | 5/2021 | Shimizu | |

FOREIGN PATENT DOCUMENTS

| | | | |
|---|---|---|---|
| JP | 2018152265 | A | 9/2018 |
| JP | 2019067500 | A | 4/2019 |

* cited by examiner

*Primary Examiner* — Oluseye Iwarere
*Assistant Examiner* — Thaslimur Rahman
(74) *Attorney, Agent, or Firm* — Muncy, Geissler, Olds & Lowe, P.C.

(57) ABSTRACT

A connector assembly includes a first connector having a first insulator and a first contact, a second connector having a second insulator and a second contact and fitted to the first connector along a fitting direction, a lever member rotatably held by one of the first insulator and the second insulator, a push member used to press the first contact and the second contact against each other, a first cam mechanism moving the first insulator and the second insulator relatively along the fitting direction in conjunction with rotation of the lever member, and a second cam mechanism moving the push member in conjunction with rotation of the lever member.

20 Claims, 37 Drawing Sheets

CONNECTOR ASSEMBLY FOR FITTING A FIRST CONNECTOR AND A SECOND CONNECTOR UPON ROTATION OF A LEVER MEMBER

BACKGROUND OF THE INVENTION

The present invention relates to a connector assembly, particularly to a connector assembly that performs the fitting operation between a first connector and a second connector upon rotation of a lever member.

Conventionally, there has been known a connector assembly using rotation of a lever member to facilitate the fitting operation of a pair of connectors. For example, JP 2018-152265 A discloses a connector assembly including a first connector 1 and a second connector 2 to be fitted to the first connector 1 along a fitting direction D, as shown in FIG. 58. A first housing 1A of the first connector 1 is provided with a protrusion 1B protruding in a direction perpendicular to the fitting direction D, and a lever member 3 is rotatably attached to the outside of a second housing 2A of the second connector 2 with a rotation fulcrum portion 2B acting as its fulcrum.

The lever member 3 is provided with a guiding groove (not shown) facing the outer surface of the second housing 2A. The second connector 2 is moved to approach the first connector 1 along the fitting direction D, and the lever member 3 is rotated with the protrusion 1B of the first connector 1 being inserted in the guiding groove of the lever member 3, whereby the first connector 1 and the second connector 2 are fitted to each other.

Through fitting between the first connector 1 and the second connector 2, first contacts 1C disposed inside the first housing 1A are electrically connected to second contacts 2D inserted in contact insertion ports 2C of the second connector 2 as shown in FIG. 59.

The second contacts 2D are connected to ends of electric wires 4, and for instance, when the first connector 1 is mounted on an electric device (not shown), electric current can be applied to the electric device through the electric wires 4.

When electric current is applied to an electric device using the foregoing connector assembly, the electric wires 4 connected to the second contacts 2D need to have a larger thickness as electric current increases.

However, when, for instance, the electric device is disposed in an environment where the electric device receives an external force such as vibration, e.g., installed in a vehicle, the external force would be transmitted via the thick electric wires 4 to the points of contact between the first contacts 1C and the second contacts 2D, resulting in poor contact.

The contact reliability can be improved by increasing contact forces between the first contacts 1C and the second contacts 2D, but this may lead to an increase in a necessary insertion force in fitting the second connector 2 to the first connector 1, making it harder to easily perform the fitting operation between the first connector 1 and the second connector 2 even with the use of rotation of the lever member 3. Furthermore, increased contact forces may damage the surfaces of the first contacts 1C and the second contacts 2D, and this may lead to lower contact reliability.

SUMMARY OF THE INVENTION

The present invention has been made to overcome conventional problems as above and aims at providing a connector assembly that can improve contact reliability between a first contact and a second contact while ensuring easy fitting therebetween.

A connector assembly according to the present invention comprises:

- a first connector including a first insulator and a first contact held by the first insulator;
- a second connector including a second insulator and a second contact held by the second insulator, the second connector being fitted to the first connector along a fitting direction;
- a lever member rotatably held by one of the first insulator and the second insulator;
- a push member used to press the first contact and the second contact against each other;
- a first cam mechanism moving the first insulator and the second insulator relatively along the fitting direction in conjunction with rotation of the lever member; and
- a second cam mechanism moving the push member in conjunction with rotation of the lever member,
- wherein in a state where the second insulator is situated at a fitting start position with respect to the first insulator, when the lever member is rotated from an initial rotational position to a first rotational position, the second insulator is moved to a fitting position along the fitting direction by the first cam mechanism, and when the lever member is further rotated from the first rotational position to a second rotational position, the push member is moved by the second cam mechanism such that the first contact and the second contact come into contact with each other at a predetermined contact pressure with the second insulator being kept at the fitting position.

DETAILED DESCRIPTION OF THE INVENTION

Embodiments of the present invention are described below with reference to the accompanying drawings.

Embodiment 1

Figure 1:
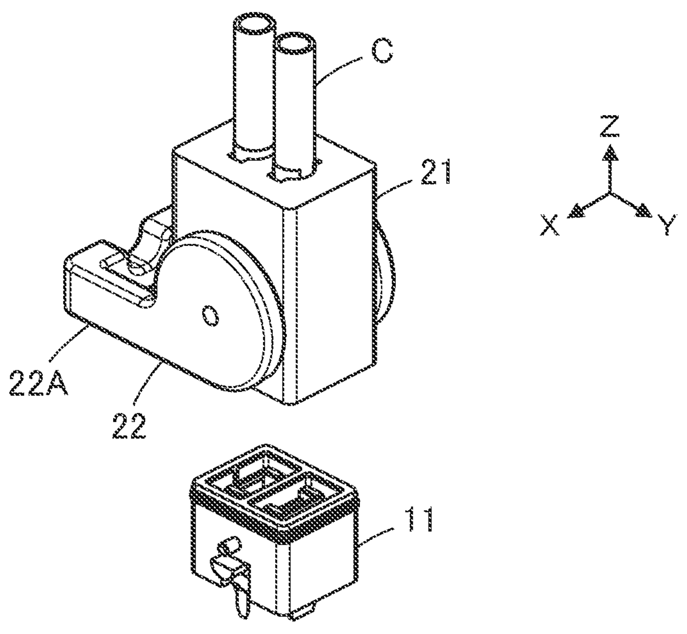
FIG. 1 is a perspective view showing a connector assembly according to Embodiment 1 in the non-fitted state.

FIG. 1 shows a connector assembly according to Embodiment 1 in the non-fitted state. The connector assembly includes a first connector 11 and a second connector 21 to be fitted to the first connector 11 along a fitting direction. For instance, the first connector 11 is mounted on an electric device which is not illustrated while the second connector 21 is attached to ends of two electric wires C, whereby the two electric wires C can be detachably connected to the electric device using the connector assembly.

Fitting and detachment between the first connector 11 and the second connector 21 are carried out by operating a lever member 22 rotatably attached to the second connector 21.

For convenience, a direction in which the first connector 11 and the second connector 21 are fitted is defined as "Z direction," a direction of rotation axis of the lever member 22 attached to the second connector 21 as "X direction," and a direction perpendicular to the Z direction and the X direction as "Y direction".

The second connector 21 is moved from the +Z direction toward the −Z direction to be fitted to the first connector 11.

Figure 2:
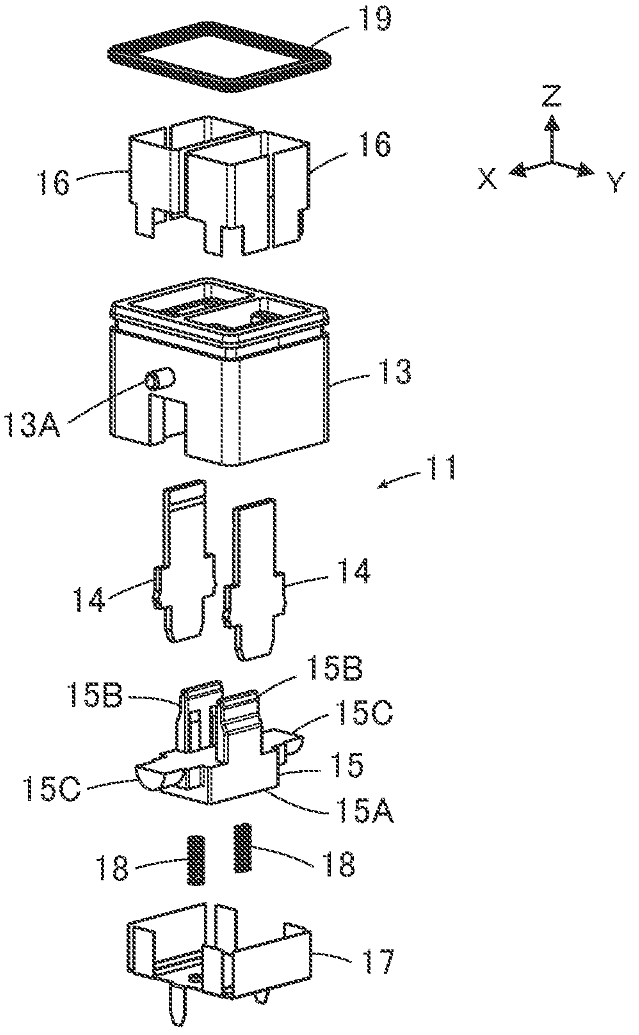
FIG. 2 is an exploded perspective view of a first connector used in Embodiment 1.

FIG. 2 shows an exploded perspective view of the first connector 11. The first connector 11 includes a first insulator 13 having a substantially rectangular cuboid outer shape, a pair of first contacts 14 each held by the first insulator 13 and extending in the Z direction, and a push member 15 held to be movable in the Z direction within the first insulator 13.

The first insulator 13 is provided at its outer surface with a pair of first pins 13A protruding separately in the +X direction and the −X direction. While only the first pin 13A formed on the outer surface of the first insulator 13 on the +X direction side is shown in FIG. 2, the same first pin 13A is also formed on the outer surface of the first insulator 13 on the −X direction side. The two first pins 13A are arranged on one straight line extending along the X direction.

The push member 15 includes a base 15A in a rectangular cuboid shape, and a pair of push plates 15B protruding in the +Z direction separately from the +Y directional end and the −Y directional end of the base 15A. The base 15A is provided at its outer surface with a pair of second pins 15C protruding separately in the +X direction and the −X direction. The two second pins 15C are arranged on one straight line extending along the X direction.

The first connector 11 further includes a pair of upper shells 16 fixed inside the first insulator 13 and disposed to surround the pair of first contacts 14 separately, and a lower shell 17 fixed inside the first insulator 13 and covering the bottom of the first insulator 13. A pair of springs 18 are disposed between the push member 15 and the lower shell 17, and a waterproof packing 19 is disposed on the outer periphery of the +Z directional end of the first insulator 13.

Figure 3:
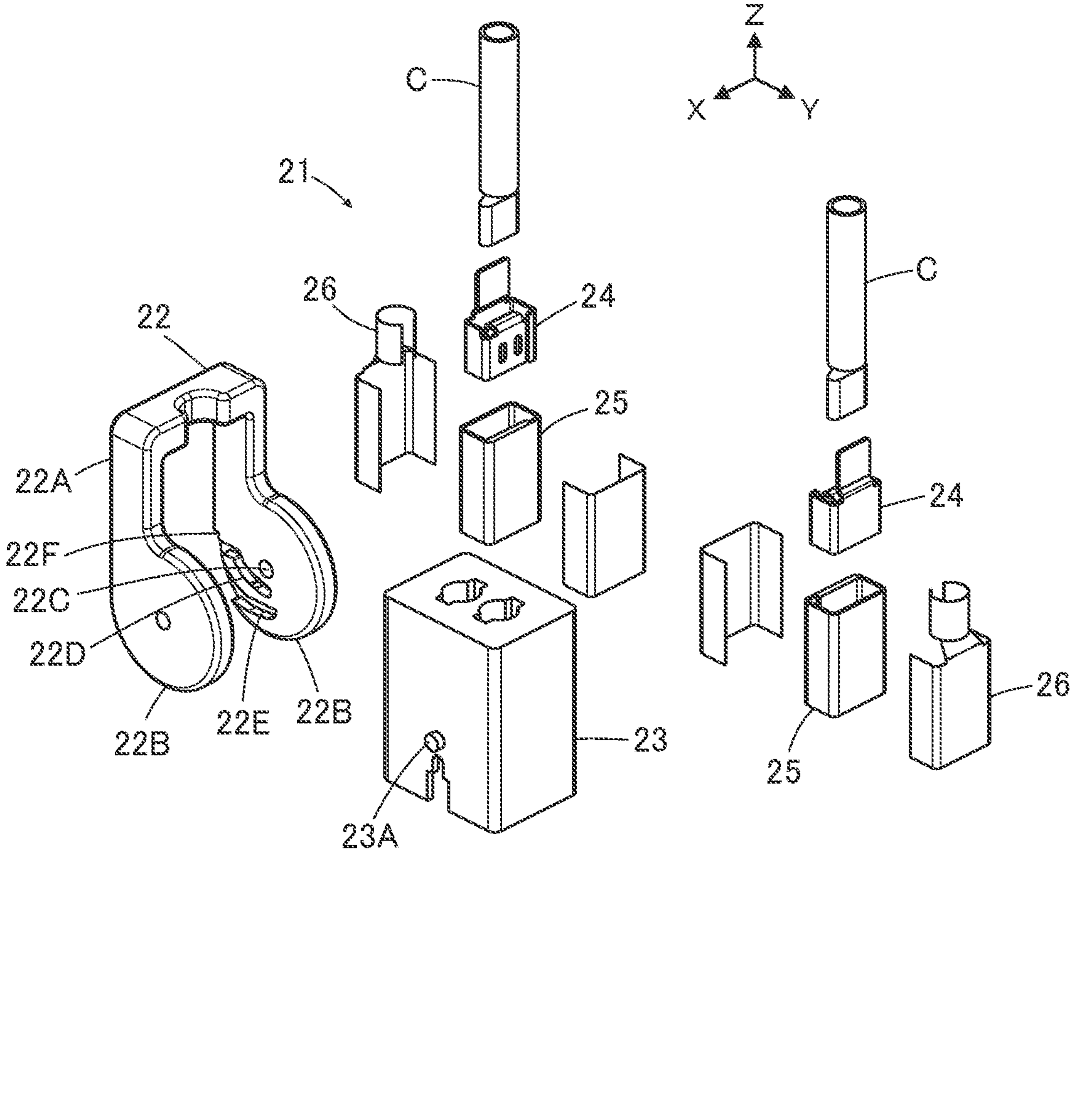
FIG. 3 is an exploded perspective view of a second connector used in Embodiment 1.

FIG. 3 shows an exploded perspective view of the second connector 21. The second connector 21 includes a second insulator 23 having a substantially rectangular cuboid outer shape, a lever member 22 rotatably attached to the second insulator 23, a pair of second contacts 24 separately connected to the ends of the two electric wires C, and a pair of inner insulators 25 separately housing the pair of second contacts 24. The second connector 21 further includes two pairs of shells 26, each pair surrounding the corresponding inner insulator 25.

The second insulator 23 is provided at its outer surface with a pair of shaft members 23A protruding separately in the +X direction and the −X direction. While only the shaft member 23A formed on the outer surface of the second insulator 23 on the +X direction side is shown in FIG. 3, the same shaft member 23A is also formed on the outer surface of the second insulator 23 on the −X direction side. The two shaft members 23A are arranged on one straight line extending along the X direction.

The lever member 22 includes a handle portion 22A bent in a U-shape, and a pair of circular plate portions 22B separately connected to the opposite ends of the handle portion 22A to face each other in the X direction and extending along a YZ plane. Of the pair of circular plate portions 22B, the surfaces facing each other are each provided with a central recess portion 22C, a first cam groove 22D situated outside the central recess portion 22C and curved in a substantially circular arc shape, a second cam groove 22E situated outside the first cam groove 22D and curved in a substantially circular arc shape, and a step portion 22F at the entrance part of the first cam groove 22D.

The pair of shaft members 23A of the second insulator 23 are inserted in the central recess portions 22C of the pair of circular plate portions 22B, so that the lever member 22 is held to be rotatable with respect to the second insulator 23.

The pair of first pins 13A of the first insulator 13 are inserted in the first cam grooves 22D of the pair of circular plate portions 22B. Those first cam grooves 22D and first pins 13A constitute a first cam mechanism that moves the first insulator 13 and the second insulator 23 relatively along the Z direction in conjunction with rotation of the lever member 22.

In addition, the pair of second pins 15C of the push member 15 are inserted in the second cam grooves 22E of the pair of circular plate portions 22B. Those second cam grooves 22E and second pins 15C constitute a second cam mechanism that moves the push member 15 along the Z direction in conjunction with rotation of the lever member 22.

The step portions 22F of the pair of circular plate portions 22B contact the pair of second pins 15C of the push member 15 to push the push member 15 in the −Z direction when the fitting between the first connector 11 and the second connector 21 starts.

Figure 4:
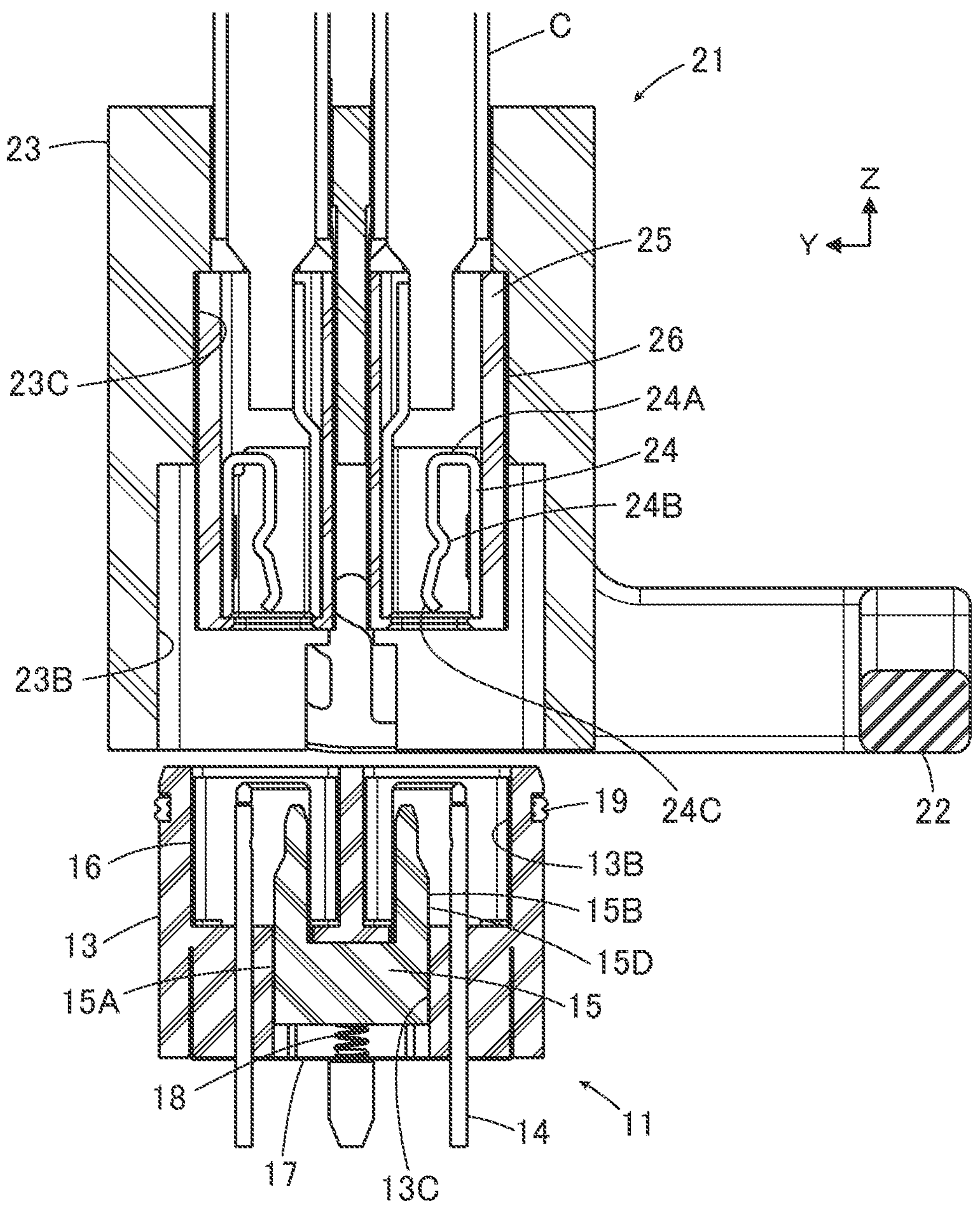
FIG. 4 is a cross-sectional view showing the connector assembly according to Embodiment 1 in the non-fitted state.

As shown in FIG. 4, the first insulator 13 of the first connector 11 is provided, in its +Z direction-side portion, with a pair of second contact housing portions 13B of recess shape disposed adjacent to each other in the Y direction and opening in the +Z direction and, in its −Z direction-side portion, with one push member housing portion 13C of recess shape opening in the −Z direction.

The pair of first contacts 14 have a flat plate shape and are fixed to the first insulator 13 while penetrating the first insulator 13 in the Z direction. The +Z directional end of each first contact 14 is exposed inside the corresponding second contact housing portion 13B to protrude in the +Z direction.

The base 15A of the push member 15 is housed in the push member housing portion 13C to be movable in the Z direction, and the pair of push plates 15B of the push member 15 each protrude inside the corresponding second contact housing portion 13B. The pair of push plates 15B each have a pushing surface 15D facing the corresponding first contact 14. The −Z directional end of the push member housing portion 13C is closed by the lower shell 17, and the push member 15 is pushed in the +Z direction by the springs 18 disposed between the base 15A and the lower shell 17. A Z-directional position of the push member 15 with respect to the first insulator 13 at this time is called "initial position."

The second insulator 23 of the second connector 21 is provided with a first connector housing portion 23B of recess shape opening in the −Z direction, and further with a pair of second contact holding portions 23C of recess shape on the +Z direction side of the first connector housing portion 23B. The pair of second contact holding portions 23C are adjacent to each other in the Y direction and each communicate with the first connector housing portion 23B.

The pair of second contacts 24 connected to the ends of the two electric wires C are each housed in the inner insulator 25 and surrounded by the pair of shells 26; in this state, the pair of second contacts 24 are held in the pair of second contact holding portions 23C. The +Z directional portion of each second contact 24 is housed in and held by the second contact holding portion 23C, and the −Z directional portion thereof protrudes in the −Z direction inside the first connector housing portion 23B.

Each second contact 24 is formed of a spring contact of U-shape opening in the −Z direction and includes a fulcrum portion 24A formed at the bent part of the U-shape, a contact point portion 24B situated on the −Z direction side from the fulcrum portion 24A, and a point-of-effort portion 24C situated on the −Z direction side from the contact point portion 24B and forming a free end. The contact point portion 24B and the point-of-effort portion 24C are disposed to be elastically displaceable in the Y direction with respect to the fulcrum portion 24A. The contact point portion 24B contacts the first contact 14 of the first connector 11 when the first connector 11 and the second connector 21 are fitted with each other, and the point-of-effort portion 24C receives a pushing force in the Y direction from the pushing surface 15D of the push plate 15B of the push member 15 of the first connector 11.

Next, the fitting operation between the first connector 11 and the second connector 21 is described.

The rotation angle of the lever member 22 when the handle portion 22A extends along the Y direction as shown in FIG. 1 is called "0 degrees," and the rotational position of the lever member 22 in this state is called "initial rotational position." The lever member 22 is attached to the second connector 21 to be rotatable from 0 to 90 degrees in rotation angle.

Figure 5:
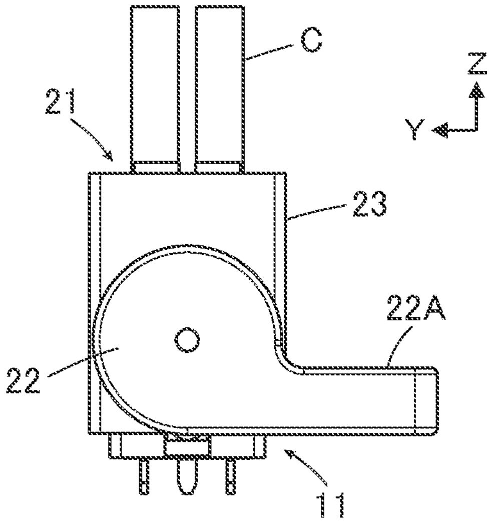
FIG. 5 is a side view showing the connector assembly according to Embodiment 1 when a lever member is at a rotation angle of 0 degrees in fitting operation.
Figure 6:
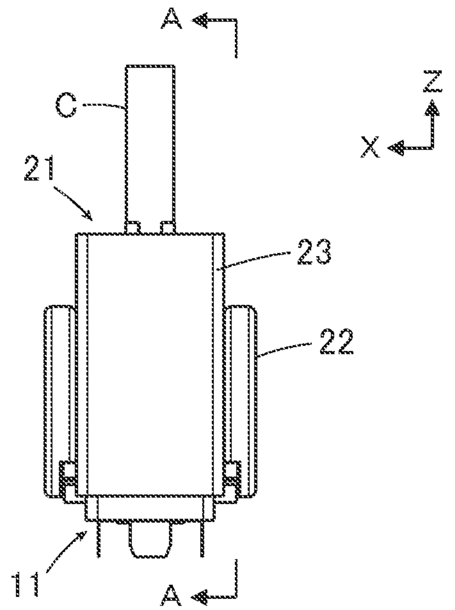
FIG. 6 is a front view showing the connector assembly according to Embodiment 1 when the lever member is at a rotation angle of 0 degrees in fitting operation.

First, in the state where the lever member 22 is at a rotation angle of 0 degrees, the second connector 21 is moved toward the first connector 11 from the +Z direction to the −Z direction, whereby the +Z directional portion of the first connector 11 is inserted into the interior of the second insulator 23 of the second connector 21 as shown in FIGS. 5 and 6.

Figure 7:
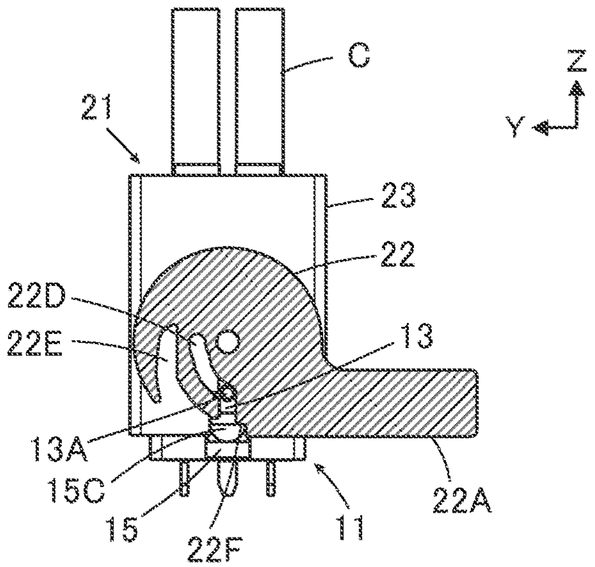
FIG. 7 is a cross-sectional view taken along line A-A in FIG. 6.

As a consequence, the second insulator 23 of the second connector 21 is situated at a fitting start position with respect to the first insulator 13 of the first connector 11 as shown in FIG. 7. The first pins 13A of the first connector 11 are inserted in the entrances of the first cam grooves 22D of the lever member 22, while the second pins 15C of the push member 15 are not inserted in the second cam grooves 22E and situated away from the second cam grooves 22E but pushed in the −Z direction by the step portions 22F of the lever member 22.

Figure 8:
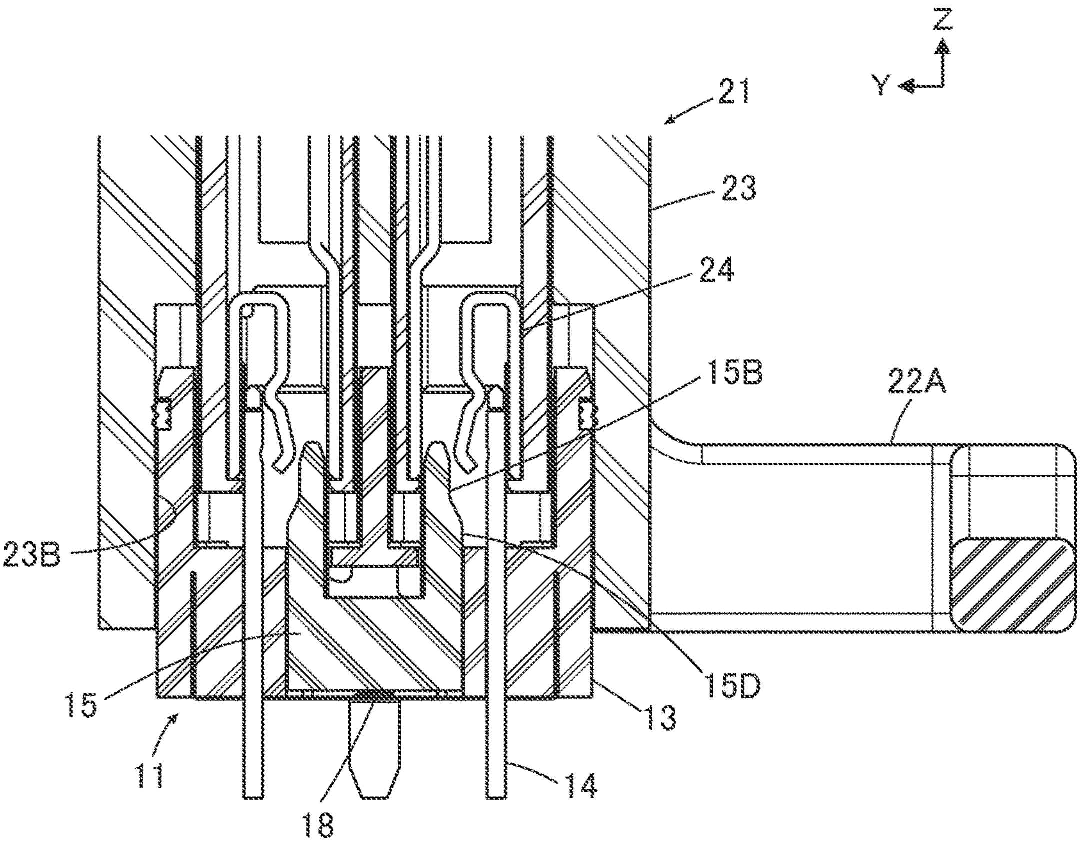
FIG. 8 is an enlarged partial cross-sectional view showing the connector assembly according to Embodiment 1 when the lever member is at a rotation angle of 0 degrees in fitting operation.

At this time, as shown in FIG. 8, the first insulator 13 of the first connector 11 is inserted up to the middle position, in the Z direction, of the interior of the first connector housing portion 23B of the second connector 21, and the first contacts 14 start to be inserted into the second contacts 24 of U-shape opening in the −Z direction. The push member 15 is situated at a withdrawn position where the push member 15 is pushed in the −Z direction against elastic forces of the springs 18 because pushed by the step portions 22F of the lever member 22. Accordingly, the pushing surfaces 15D of the push plates 15B do not contact the second contacts 24 yet.

When the lever member 22 is rotated in this state, the first pins 13A of the first connector 11 relatively move forward along the first cam grooves 22D of the lever member 22, and the second insulator 23 of the second connector 21 gradually moves in the −Z direction with respect to the first insulator 13 of the first connector 11.

Even when the second pins 15C of the push member 15 are separated from the step portions 22F of the lever member 22 as the lever member 22 is rotated, the push member 15 is held at the withdrawn position with respect to the first insulator 13 as long as the second pins 15C are pushed in the −Z direction by outer peripheries of the lever member 22 situated outside the first cam grooves 22D; thus, the pushing surfaces 15D of the push plates 15B still do not contact the second contacts 24.

Figure 9:
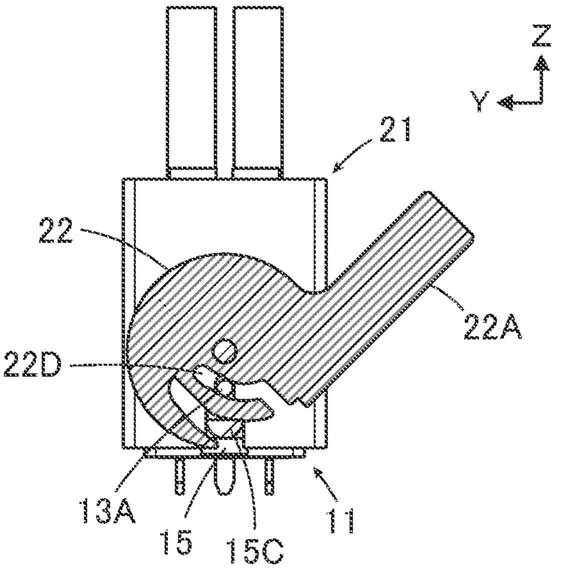
FIG. 9 is a cross-sectional view of the connector assembly according to Embodiment 1 in a cross section corresponding to line A-A of FIG. 6 when the lever member is at a rotation angle of 45 degrees in fitting operation.

When the lever member 22 is rotated such that the handle portion 22A moves to an angle of 45 degrees with respect to the Y direction as shown in FIG. 9, the first pins 13A of the first connector 11 relatively move forward along the first cam grooves 22D of the lever member 22, while the second pins 15C of the push member 15 are still pushed in the −Z direction by the outer peripheries of the lever member 22 situated outside the first cam grooves 22D.

Figure 10:
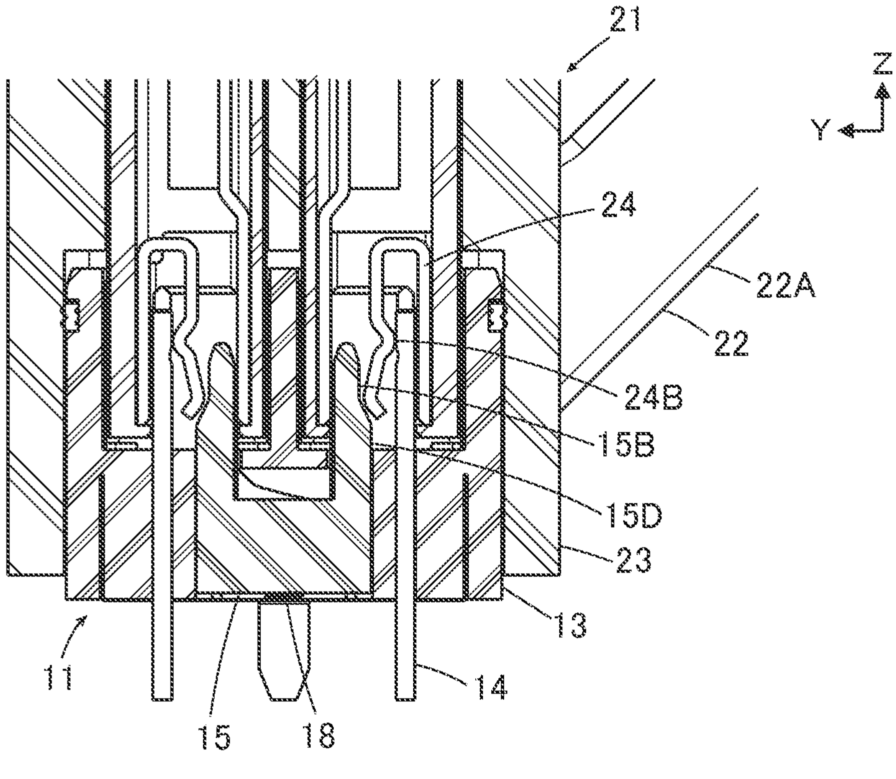
FIG. 10 is an enlarged partial cross-sectional view showing the connector assembly according to Embodiment 1 when the lever member is at a rotation angle of 45 degrees in fitting operation.

Accordingly, as shown in FIG. 10, the second insulator 23 of the second connector 21 moves in the −Z direction with respect to the first insulator 13 of the first connector 11, and this allows the contact point portions 24B of the second contacts 24 to face lateral surfaces, in the Y direction, of the first contacts 14. The Z-directional position of the second insulator 23 with respect to the first insulator 13 at this time is called "fitting position," and the rotational position of the lever member 22 is called "first rotational position."

The push member 15 is held at the withdrawn position with respect to the first insulator 13, and the pushing surfaces 15D of the push plates 15B still do not contact the second contacts 24.

When the lever member 22 is further rotated from this state, the first pins 13A of the first connector 11 relatively move forward further along the first cam grooves 22D of the lever member 22, but the Z-directional position of the second insulator 23 with respect to the first insulator 13 does not change due to the shape of the first cam grooves 22D. The second pins 15C of the push member 15 start to be inserted into the second cam grooves 22E of the lever member 22.

Figure 11:
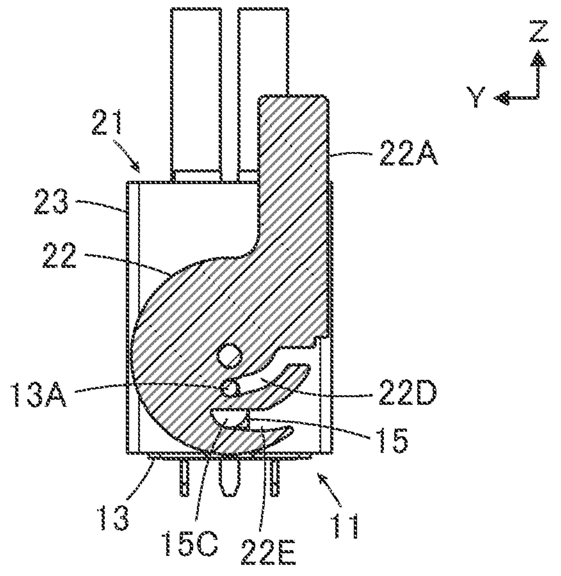
FIG. 11 is a cross-sectional view of the connector assembly according to Embodiment 1 in a cross section corresponding to line A-A of FIG. 6 when the lever member is at a rotation angle of 90 degrees in fitting operation.

Subsequently, when the lever member 22 is rotated until the handle portion 22A crosses the Y direction at an angle of 90 degrees as shown in FIG. 11, the first pins 13A of the first connector 11 are inserted up to the deepest parts of the first cam grooves 22D of the lever member 22, but the Z-directional position of the second insulator 23 with respect to the first insulator 13 does not change due to the shape of the first cam grooves 22D. The second pins 15C of the push member 15 are also inserted up to the deepest parts of the second cam grooves 22E of the lever member 22.

Figure 12:
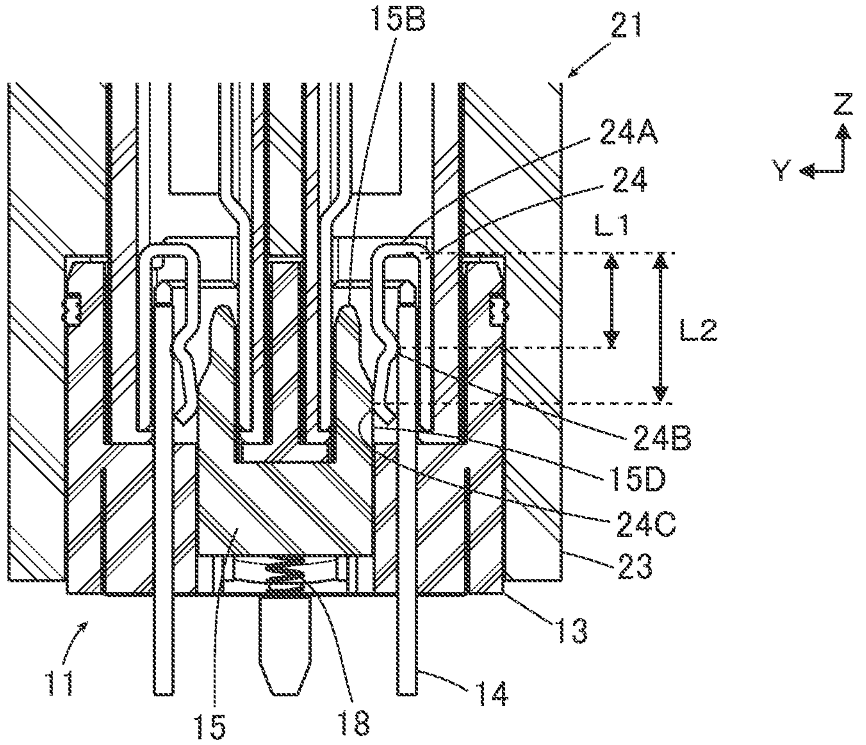
FIG. 12 is an enlarged partial cross-sectional view showing the connector assembly according to Embodiment 1 when the lever member is at a rotation angle of 90 degrees in fitting operation.

Consequently, as shown in FIG. 12, the push member 15 moves in the +Z direction with respect to the first insulator 13 to return from the withdrawn position to the initial position while the second insulator 23 of the second connector 21 is kept at the fitting position with respect to the first insulator 13 of the first connector 11, and the pushing surfaces 15D of the push plates 15B push the point-of-effort portions 24C of the second contacts 24 in the Y direction.

A distance L2 from the fulcrum portion 24A to the point-of-effort portion 24C in the second contact 24 is set longer than a distance L1 from the fulcrum portion 24A to the contact point portion 24B, and therefore, a force greater than a pushing force that the point-of-effort portion 24C receives from the pushing surface 15D of the push plate 15B acts on the contact point portion 24B due to the so-called principle of leverage, and this allows the contact point portion 24B of the second contact 24 to contact the first contact 14 with high contact pressure.

The rotational position of the lever member 22 at this time is called "second rotational position."

In this manner, when the lever member 22 is rotated from the initial rotational position where the handle portion 22A is at an angle of 0 degrees with respect to the Y direction to the first rotational position where the handle portion 22A is at an angle of 45 degrees with respect to the Y direction, the second insulator 23 of the second connector 21 can be moved from the fitting start position to the fitting position with respect to the first insulator 13 of the first connector 11 while the push member 15 is held at the withdrawn position with respect to the first insulator 13 of the first connector 11 such that the push plates 15B do not contact the second contacts 24. Thus, the first connector 11 and the second connector 21 can be easily fitted to each other with a small insertion force.

When the lever member 22 is further rotated from the first rotational position to the second rotational position where the handle portion 22A is at an angle of 90 degrees with respect to the Y direction, the push member 15 is returned from the withdrawn position to the initial position with respect to the first insulator 13 of the first connector 11 with the second insulator 23 of the second connector 21 being kept at the fitting position with respect to the first insulator 13 of the first connector 11, so that the push plates 15B can push the point-of-effort portions 24C of the second contacts 24 in the Y direction, thereby allowing the contact point portions 24B of the second contacts 24 to contact the first contacts 14 with high contact pressure.

At this time, since the first contact 14 and the second contact 24 are pressed against each other in the Y direction without rubbing together in the Z direction, the first contact 14 and the second contact 24 are electrically connected to each other while their surfaces are prevented from being damaged.

Thus, even when the first connector 11 is mounted on an electric device installed in an environment where the electric device receives an external force such as vibration, it is possible to, while easily fitting the first connector 11 and the second connector 21 to each other, establish contact between the first contacts 14 and the second contacts 24 with high contact pressure, thus achieving reliable electric connection.

Embodiment 2

Figure 13:
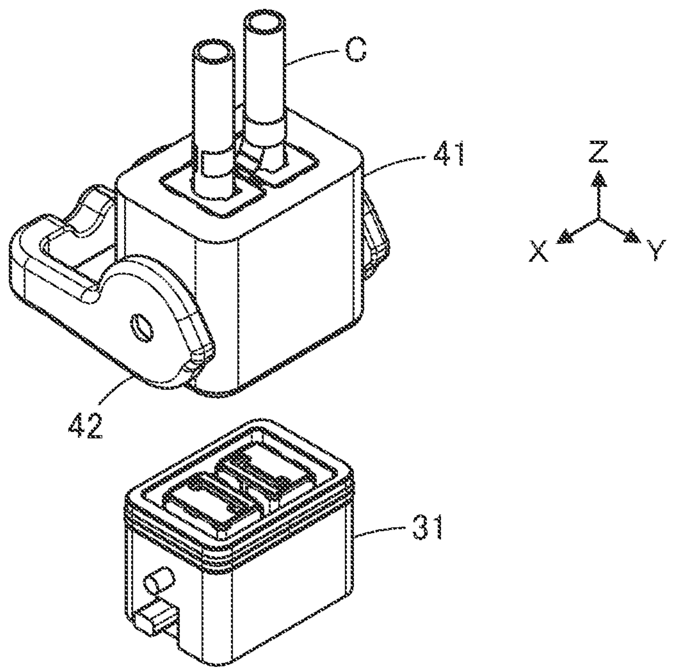
FIG. 13 is a perspective view showing a connector assembly according to Embodiment 2 in the non-fitted state.

FIG. 13 shows a connector assembly according to Embodiment 2 in the non-fitted state. The connector assembly includes a first connector 31 and a second connector 41 to be fitted to the first connector 31 along a fitting direction. The second connector 41 is attached to ends of two electric wires C.

Fitting and detachment between the first connector 31 and the second connector 41 are carried out by operating a lever member 42 rotatably attached to the second connector 41.

For convenience, a direction in which the first connector 31 and the second connector 41 are fitted is defined as "Z direction," a direction of rotation axis of the lever member 42 attached to the second connector 41 as "X direction," and a direction perpendicular to the Z direction and the X direction as "Y direction".

The second connector 41 is moved from the +Z direction toward the −Z direction to be fitted to the first connector 31.

Figure 14:
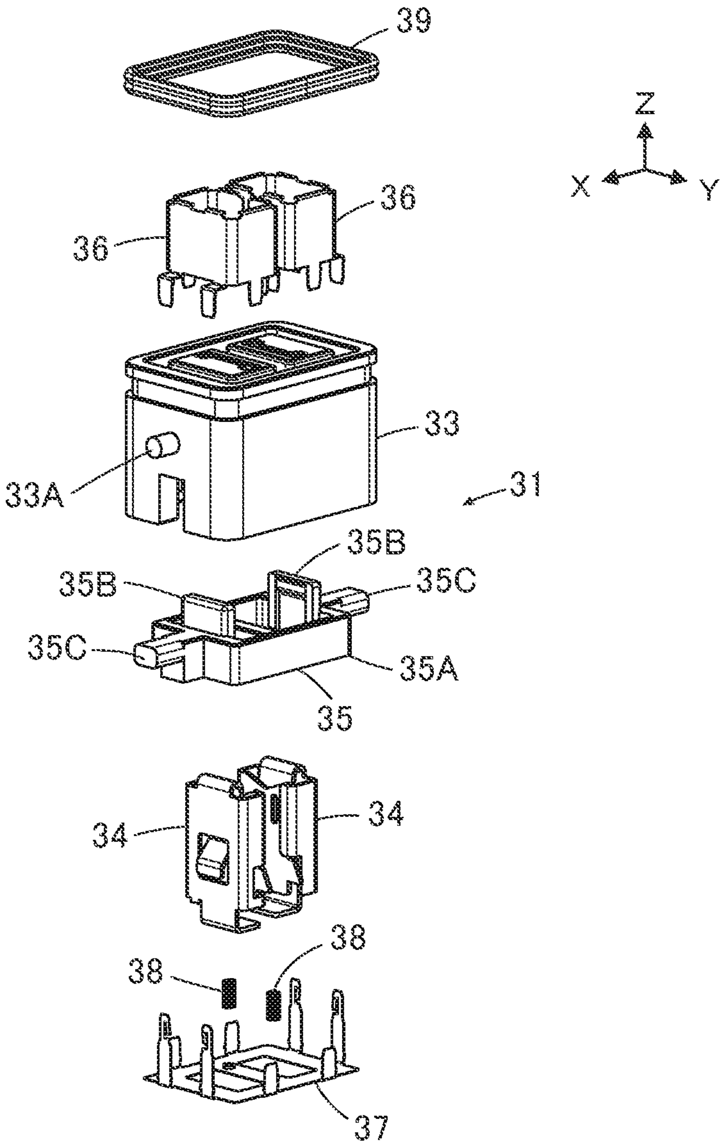
FIG. 14 is an exploded perspective view of a first connector used in Embodiment 2.

FIG. 14 shows an exploded perspective view of the first connector 31. The first connector 31 includes a first insulator 33 having a substantially rectangular cuboid outer shape, a pair of first contacts 34 each held by the first insulator 33 and extending in the Z direction, and a push member 35 held to be movable in the Z direction within the first insulator 33.

The first insulator 33 is provided at its outer surface with a pair of first pins 33A protruding separately in the +X direction and the −X direction. While only the first pin 33A formed on the outer surface of the first insulator 33 on the +X direction side is shown in FIG. 14, the same first pin 33A is also formed on the outer surface of the first insulator 33 on the −X direction side. The two first pins 33A are arranged on one straight line extending along the X direction.

The push member 35 includes a base 35A in a rectangular frame shape, and a pair of push plates 35B protruding in the +Z direction separately from the +X directional end and the −X directional end of the base 35A. The base 35A is provided at its outer surface with a pair of second pins 35C protruding separately in the +X direction and the −X direction. The two second pins 35C are arranged on one straight line extending along the X direction.

The first connector 31 further includes a pair of upper shells 36 fixed inside the first insulator 33 and disposed to surround the pair of first contacts 34 separately, and a lower shell 37 fixed inside the first insulator 33. A pair of springs 38 are disposed between the push member 35 and the lower shell 37, and a waterproof packing 39 is disposed on the outer periphery of the +Z directional end of the first insulator 33.

Figure 15:
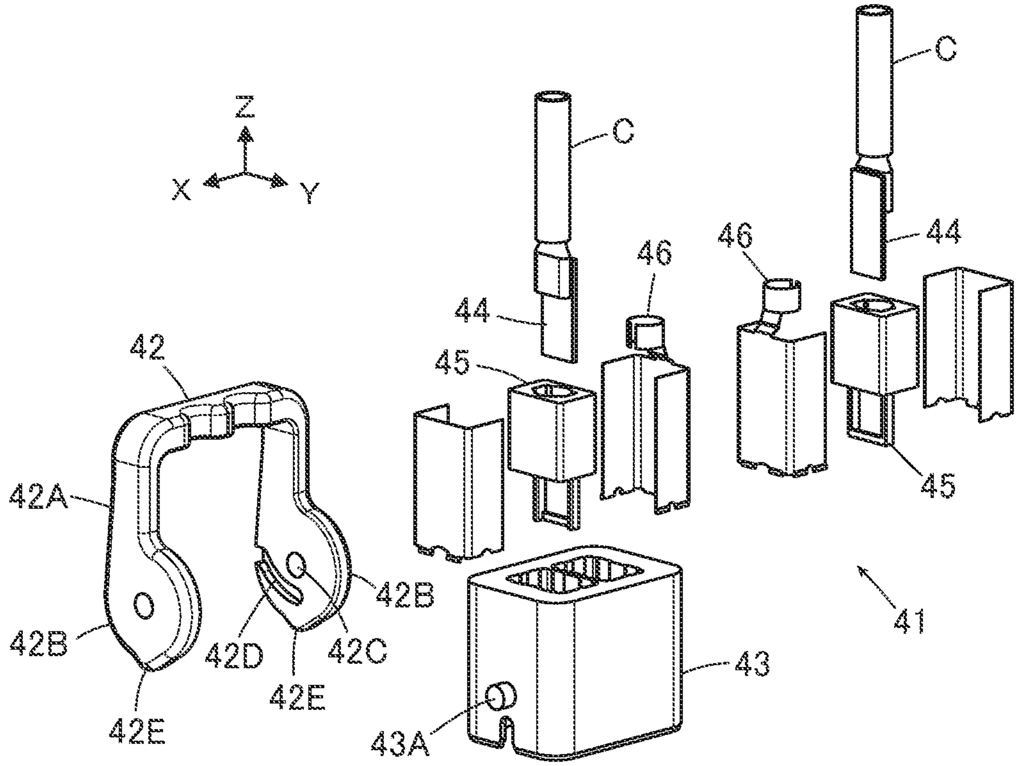
FIG. 15 is an exploded perspective view of a second connector used in Embodiment 2.

FIG. 15 shows an exploded perspective view of the second connector 41. The second connector 41 includes a second insulator 43 having a substantially rectangular cuboid outer shape, a lever member 42 rotatably attached to the second insulator 43, a pair of second contacts 44 separately connected to the ends of the two electric wires C, and a pair of inner insulators 45 separately housing the pair of second contacts 44. The second connector 41 further includes two pairs of shells 46, each pair surrounding the corresponding inner insulator 45.

The second insulator 43 is provided at its outer surface with a pair of shaft members 43A protruding separately in the +X direction and the −X direction. While only the shaft member 43A formed on the outer surface of the second insulator 43 on the +X direction side is shown in FIG. 15, the same shaft member 43A is also formed on the outer surface of the second insulator 43 on the −X direction side. The two shaft members 43A are arranged on one straight line extending along the X direction.

The lever member 42 includes a handle portion 42A bent in a U-shape, and a pair of circular plate portions 42B separately connected to the opposite ends of the handle portion 42A to face each other in the X direction and extending along a YZ plane. Of the pair of circular plate portions 42B, the surfaces facing each other are each provided with a central recess portion 42C and a cam groove 42D situated outside the central recess portion 42C and curved in a substantially circular arc shape. Each of the pair of circular plate portions 42B is also provided at its outer periphery with a peripheral cam surface 42E protruding in the radial direction of the circular plate portion 42B.

The pair of shaft members 43A of the second insulator 43 are inserted in the central recess portions 42C of the pair of circular plate portions 42B, so that the lever member 42 is held to be rotatable with respect to the second insulator 43.

The pair of first pins 33A of the first insulator 33 are inserted in the cam grooves 42D of the pair of circular plate portions 42B. Those cam grooves 42D and first pins 33A constitute a first cam mechanism that moves the first insulator 33 and the second insulator 43 relatively along the Z direction in conjunction with rotation of the lever member 42.

In addition, the peripheral cam surfaces 42E of the pair of circular plate portions 42B contact the pair of second pins 35C of the push member 35 in accordance with the rotation angle of the lever member 42. Those peripheral cam surfaces 42E and second pins 35C constitute a second cam mechanism that moves the push member 35 along the Z direction in conjunction with rotation of the lever member 42.

Figure 16:
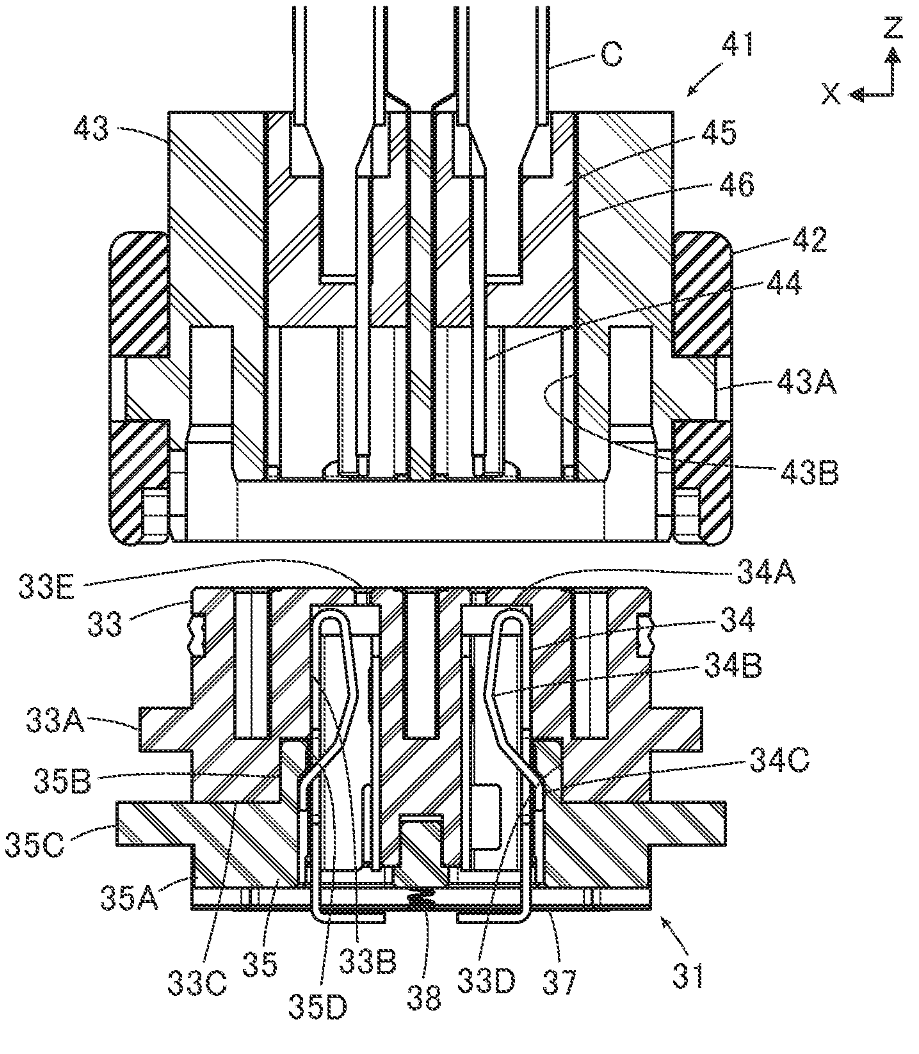
FIG. 16 is a cross-sectional view showing the connector assembly according to Embodiment 2 in the non-fitted state.

As shown in FIG. 16, the first insulator 33 of the first connector 31 is provided with a pair of first contact housing portions 33B of recess shape disposed adjacent to each other in the X direction and extending in the Z direction and is also provided, in its −Z direction-side portion, with one push member housing portion 33C of recess shape opening in the −Z direction and communicating with the pair of first contact housing portions 33B. Further, a pair of push plate housing portions 33D of recess shape opening toward the corresponding first contact housing portions 33B and communicating with the push member housing portion 33C are formed on the outside, in the X direction, of the pair of first contact housing portions 33B.

The pair of first contacts 34 are separately housed in the pair of first contact housing portions 33B. Each first contact 34 is formed of a spring contact bent in a U-shape and includes a fulcrum portion 34A formed at the bent part of the U-shape, a contact point portion 34B situated on the −Z direction side from the fulcrum portion 34A, and a point-of-effort portion 34C situated on the −Z direction side from the contact point portion 34B and forming a free end. The contact point portion 34B and the point-of-effort portion 34C are disposed to be elastically displaceable in the X direction with respect to the fulcrum portion 34A. The contact point portion 34B contacts the second contact 44 of the second connector 41 when the first connector 31 and the second connector 41 are fitted with each other, and the point-of-effort portion 34C receives a pushing force in the X direction from the push plate 35B of the push member 35.

The first insulator 33 is provided at its +Z directional end with a pair of through-holes 33E communicating with the pair of first contact housing portions 33B. The through-holes 33E receive the corresponding second contacts 44 of the second connector 41 when the first connector 31 and the second connector 41 are fitted to each other.

The base 35A of the push member 35 is housed in the push member housing portion 33C to be movable in the Z direction, and the pair of push plates 35B of the push member 35 are separately housed in the corresponding push plate housing portions 33D. The pair of push plates 35B are each provided at its +Z directional end with a pushing surface 35D facing the corresponding first contact 34. The pair of second pins 35C of the push member 35 protrude separately in the +X direction and the −X direction from the push member housing portion 33C.

The lower shell 37 is disposed at the −Z directional end of the push member housing portion 33C, and the push member 35 is pushed in the +Z direction by the springs 38 disposed between the base 35A and the lower shell 37 and situated at the initial position.

The second insulator 43 of the second connector 41 is provided with a pair of second contact holding portions 43B of recess shape that are adjacent to each other in the X direction and penetrate the second insulator 43 in the Z direction.

The pair of second contacts 44 connected to the ends of the two electric wires C have a flat plate shape and are each housed in the inner insulator 45 and surrounded by the pair of shells 46; in this state, the pair of second contacts 44 are held in the pair of second contact holding portions 43B. The +Z directional portion of each second contact 44 is housed in and held by the second contact holding portion 43B, and the −Z directional portion thereof protrudes in the −Z direction within the second contact holding portion 43B.

Next, the fitting operation between the first connector 31 and the second connector 41 is described.

Figure 17:
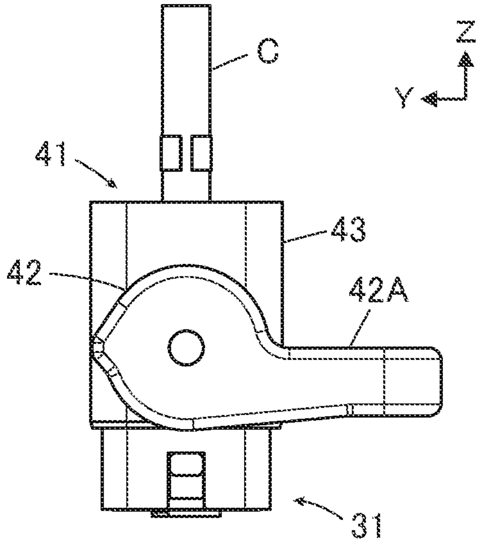
FIG. 17 is a side view showing the connector assembly according to Embodiment 2 when a lever member is at a rotation angle of 0 degrees in fitting operation.
Figure 18:
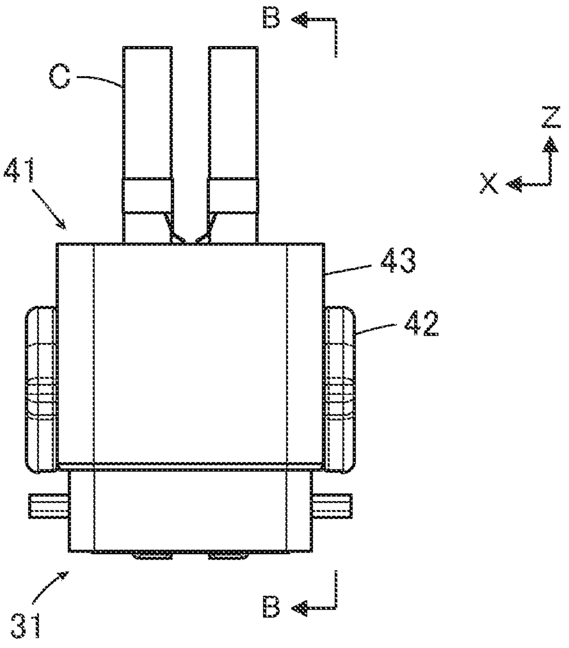
FIG. 18 is a front view showing the connector assembly according to Embodiment 2 when the lever member is at a rotation angle of 0 degrees in fitting operation.

The lever member 42 is set to the initial rotational position with a rotation angle of the lever member 42 of 0 degrees as shown in FIG. 13; in this state, the second connector 41 is moved toward the first connector 31 from the +Z direction to the −Z direction, whereby the +Z directional portion of the first connector 31 is inserted into the interior of the second insulator 43 of the second connector 41 as shown in FIGS. 17 and 18.

Figure 19:
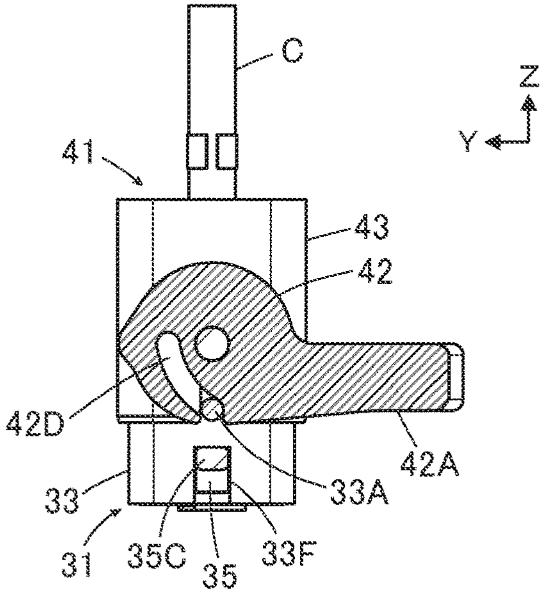
FIG. 19 is a cross-sectional view taken along line B-B in FIG. 18.

As a consequence, the second insulator 43 of the second connector 41 is situated at the fitting start position with respect to the first insulator 33 of the first connector 31 as shown in FIG. 19. The first pins 33A of the first connector 31 are inserted in the entrances of the cam grooves 42D of the lever member 42, while the second pins 35C of the push member 35 protrude in the X direction from the first insulator 33 via cutouts 33F without contacting the lever member 42, the cutouts 33F being formed at the −Z directional end of the first insulator 33.

Figure 20:
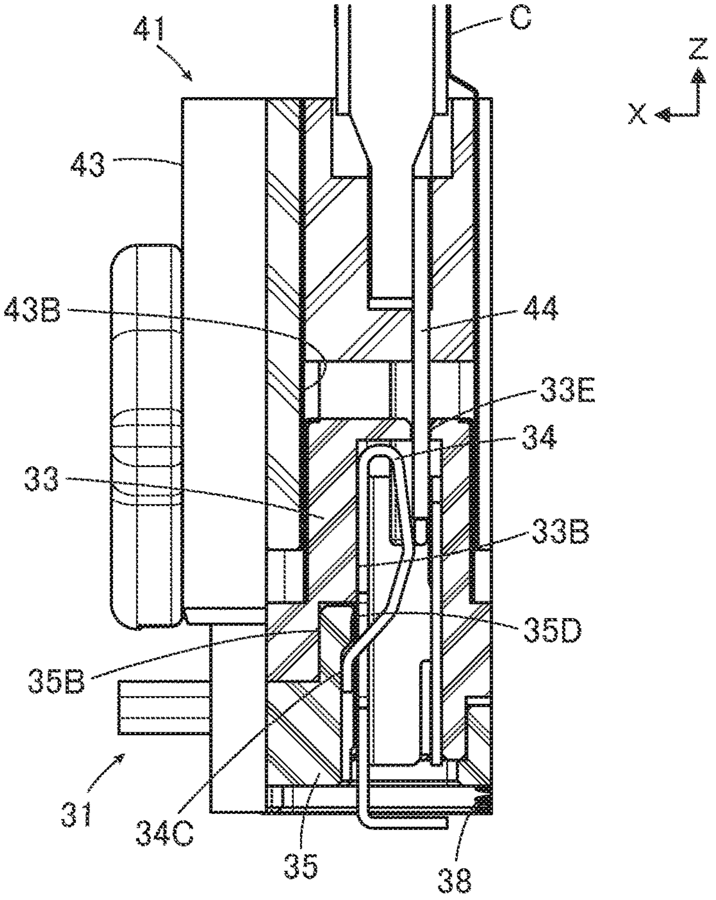
FIG. 20 is an enlarged partial cross-sectional view showing the connector assembly according to Embodiment 2 when the lever member is at a rotation angle of 0 degrees in fitting operation.

At this time, as shown in FIG. 20, the first insulator 33 is inserted up to the middle position, in the Z direction, of the interiors of the second contact holding portions 43B of the second insulator 43, and the second contacts 44 are inserted into the first contact housing portions 33B via the through-holes 33E of the first insulator 33. Thus, the second contacts 44 start contacting the first contacts 34. The push member 35 is pushed in the +Z direction by the springs 38 and situated at the initial position with respect to the first insulator 33. The pushing surfaces 35D of the push plates 35B do not contact the point-of-effort portions 34C of the first contacts 34 yet.

When the lever member 42 is rotated in this state, the first pins 33A of the first connector 31 are inserted into the cam grooves 42D of the lever member 42, and the second insulator 43 of the second connector 41 gradually moves in the −Z direction with respect to the first insulator 33 of the first connector 31.

The push member 35 is kept at the initial position with respect to the first insulator 33 unless the second pins 35C come into contact with the lever member 42 and are pushed thereby in the −Z direction.

Figure 21:
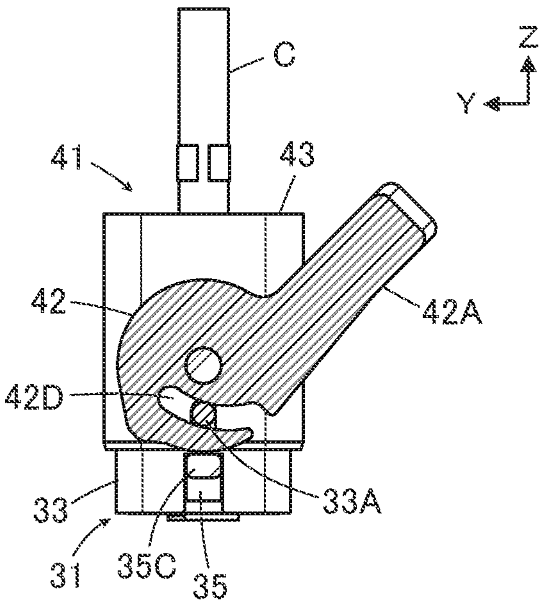
FIG. 21 is a cross-sectional view of the connector assembly according to Embodiment 2 in a cross section corresponding to line B-B of FIG. 18 when the lever member is at a rotation angle of 45 degrees in fitting operation.

When the lever member 42 is rotated to the first rotational position where the handle portion 42A is at an angle of 45 degrees with respect to the Y direction as shown in FIG. 21, the first pins 33A of the first connector 31 relatively move forward along the cam grooves 42D of the lever member 42, while the second pins 35C of the push member 35 are not pushed in the −Z direction by the outer peripheries of the lever member 42 yet.

Figure 22:
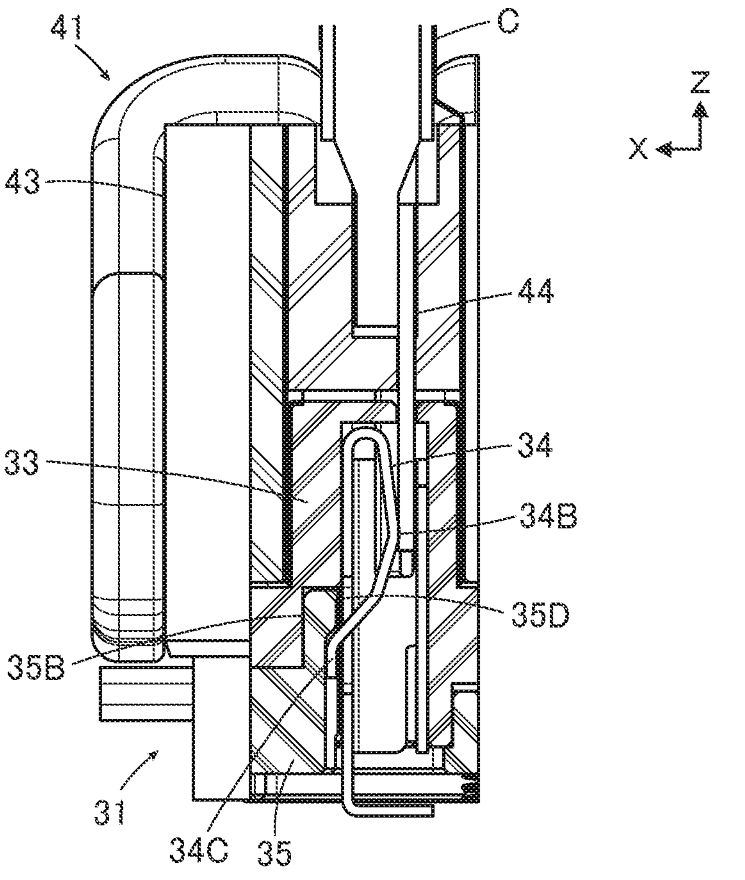
FIG. 22 is an enlarged partial cross-sectional view showing the connector assembly according to Embodiment 2 when the lever member is at a rotation angle of 45 degrees in fitting operation.

Accordingly, as shown in FIG. 22, the second insulator 43 of the second connector 41 moves in the −Z direction with respect to the first insulator 33 of the first connector 31, and this allows the lateral surfaces, in the X direction, of the second contacts 44 to face the contact point portions 34B of the first contacts 34. That is, the second insulator 43 is situated at the fitting position with respect to the first insulator 33.

On the other hand, the push member 35 is held at the initial position with respect to the first insulator 33, and the pushing surfaces 35D of the push plates 35B still do not contact the point-of-effort portions 34C of the first contacts 34.

Figure 23:
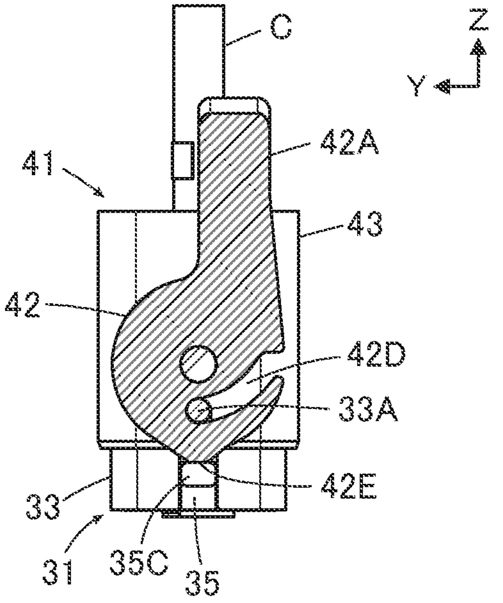
FIG. 23 is a cross-sectional view of the connector assembly according to Embodiment 2 in a cross section corresponding to line B-B of FIG. 18 when the lever member is at a rotation angle of 90 degrees in fitting operation.

From this state, when the lever member 42 is rotated to the second rotational position where the handle portion 42A is at an angle of 90 degrees with respect to the Y direction as shown in FIG. 23, the first pins 33A of the first connector 31 are inserted up to the deepest parts of the cam grooves 42D of the lever member 42, but the Z-directional position of the second insulator 43 with respect to the first insulator 33 does not change due to the shape of the cam grooves 42D.

On the other hand, the second pins 35C of the push member 35 are pushed in the −Z direction by the peripheral cam surfaces 42E protruding in the radial direction of the circular plate portions 42B of the lever member 42.

Figure 24:
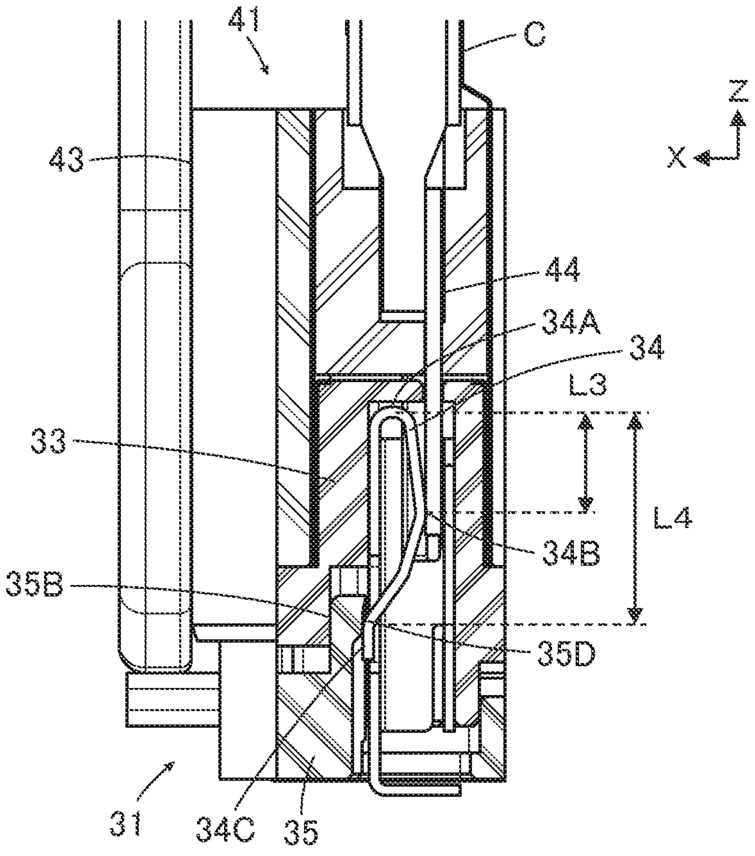
FIG. 24 is an enlarged partial cross-sectional view showing the connector assembly according to Embodiment 2 when the lever member is at a rotation angle of 90 degrees in fitting operation.

Consequently, as shown in FIG. 24, the push member 35 moves in the −Z direction with respect to the first insulator 33 to retract from the initial position to the retracted position while the second insulator 43 of the second connector 41 is kept at the fitting position with respect to the first insulator 33 of the first connector 31, so that the pushing surfaces 35D of the push plates 35B contact the point-of-effort portions 34C of the first contacts 34 and push the point-of-effort portions 34C in the X direction.

A distance L4 from the fulcrum portion 34A to the point-of-effort portion 34C in the first contact 34 is set longer than a distance L3 from the fulcrum portion 34A to the contact point portion 34B, and therefore, a force greater than a pushing force that the point-of-effort portion 34C receives from the push plate 35B of the push member 35 acts on the contact point portion 34B due to the so-called principle of leverage, and this allows the contact point portion 34B of the first contact 34 to contact the second contact 44 with high contact pressure.

In this manner, when the lever member 42 is rotated from the initial rotational position where the handle portion 42A is at an angle of 0 degrees with respect to the Y direction to the first rotational position where the handle portion 42A is at an angle of 45 degrees with respect to the Y direction, the second insulator 43 of the second connector 41 can be moved from the fitting start position to the fitting position with respect to the first insulator 33 of the first connector 31 while the push member 35 is held at the initial position with respect to the first insulator 33 of the first connector 31 such that the pushing surfaces 35D of the push plates 35B do not contact the point-of-effort portions 34C of the first contacts 34. Thus, the first connector 31 and the second connector 41 can be easily fitted to each other with a small insertion force.

When the lever member 42 is further rotated from the first rotational position to the second rotational position where the handle portion 42A is at an angle of 90 degrees with respect to the Y direction, the push member 35 is retracted from the initial position to the retracted position with respect to the first insulator 33 of the first connector 31 with the second insulator 43 of the second connector 41 being kept at the fitting position with respect to the first insulator 33 of the first connector 31, so that the push plates 35B can push the point-of-effort portions 34C of the first contacts 34 in the X direction, thereby allowing the contact point portions 34B of the first contacts 34 to contact the second contacts 44 with high contact pressure.

At this time, since the first contact 34 and the second contact 44 are pressed against each other in the X direction without rubbing together in the Z direction, the first contact 34 and the second contact 44 are electrically connected to each other while their surfaces are prevented from being damaged.

Thus, it is possible to, while easily fitting the first connector 11 and the second connector 41 to each other, establish contact between the first contacts 34 and the second contacts 44 with high contact pressure, thus achieving reliable electric connection, as with Embodiment 1.

Embodiment 3

Figure 25:
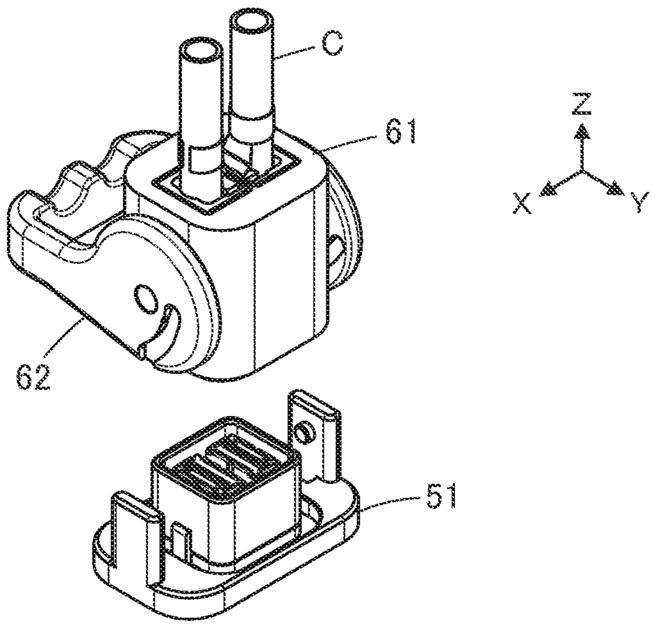
FIG. 25 is a perspective view showing a connector assembly according to Embodiment 3 in the non-fitted state.

FIG. 25 shows a connector assembly according to Embodiment 3 in the non-fitted state. The connector assembly includes a first connector 51 and a second connector 61 to be fitted to the first connector 51 along a fitting direction. The second connector 61 is attached to ends of two electric wires C.

Fitting and detachment between the first connector 51 and the second connector 61 are carried out by operating a lever member 62 rotatably attached to the second connector 61.

For convenience, a direction in which the first connector 51 and the second connector 61 are fitted is defined as "Z direction," a direction of rotation axis of the lever member 62 attached to the second connector 61 as "X direction," and a direction perpendicular to the Z direction and the X direction as "Y direction".

The second connector 61 is moved from the +Z direction toward the −Z direction to be fitted to the first connector 51.

Figure 26:
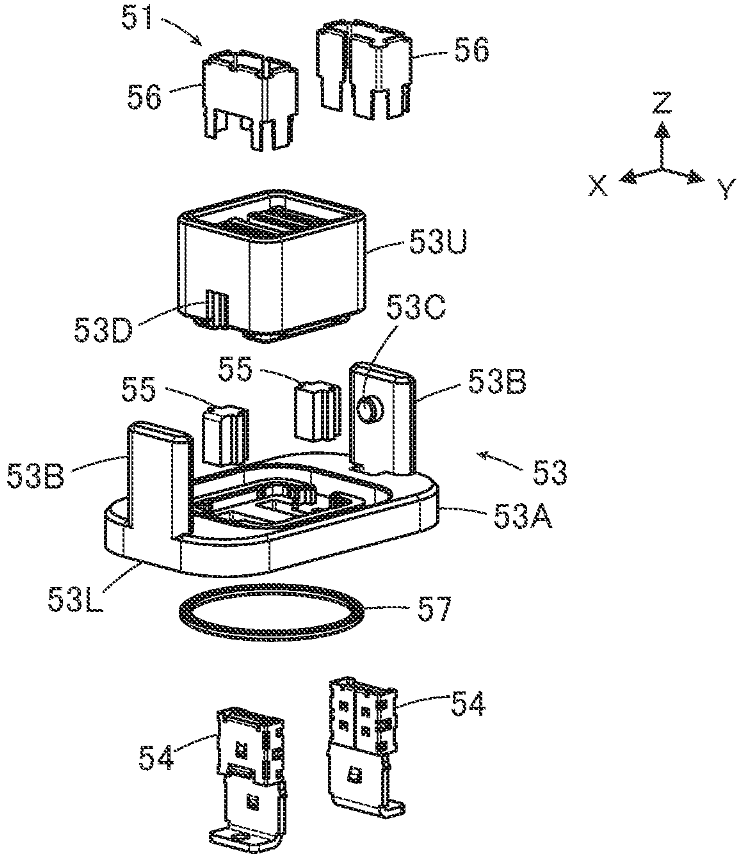
FIG. 26 is an exploded perspective view of a first connector used in Embodiment 3.

FIG. 26 shows an exploded perspective view of the first connector 51. The first connector 51 includes a lower insulator 53L, an upper insulator 53U joined to the lower insulator 53L, a pair of first contacts 54 each held by the upper insulator 53U and extending in the Z direction, and a pair of first push members 55 of block shape held by the lower insulator 53L and the upper insulator 53U. The lower insulator 53L and the upper insulator 53U are joined together to form a first insulator 53.

The lower insulator 53L includes a base 53A of flat plate shape extending along an XY plane, and a pair of support portions 53B of flat plate shape that extend in the +Z direction separately from the +X directional end and the −X directional end of the base 53A and face each other in the X direction. A pair of first pins 53C protruding in the X direction are formed on the opposed surfaces of the pair of support portions 53B. While only the first pin 53C formed on the support portion 53B on the −X direction side is shown in FIG. 26, the same first pin 53C is also formed on the support portion 53B on the +X direction side. The two first pins 53C are arranged on one straight line extending along the X direction.

The upper insulator 53U has a substantially rectangular cuboid outer shape and is provided, at its opposite lateral sides in the X direction, with cutouts 53D in which the corresponding first push members 55 are inserted. While only the cutout 53D formed on the +X direction side of the upper insulator 53U is shown in FIG. 26, the same cutout 53D is also formed on the −X direction side of the upper insulator 53U.

The first connector 51 further includes a pair of shells 56 fixed inside the upper insulator 53U and disposed to surround the pair of first contacts 54 separately, and a waterproof packing 57 disposed on the bottom of the lower insulator 52 on the −Z direction side.

Figure 27:
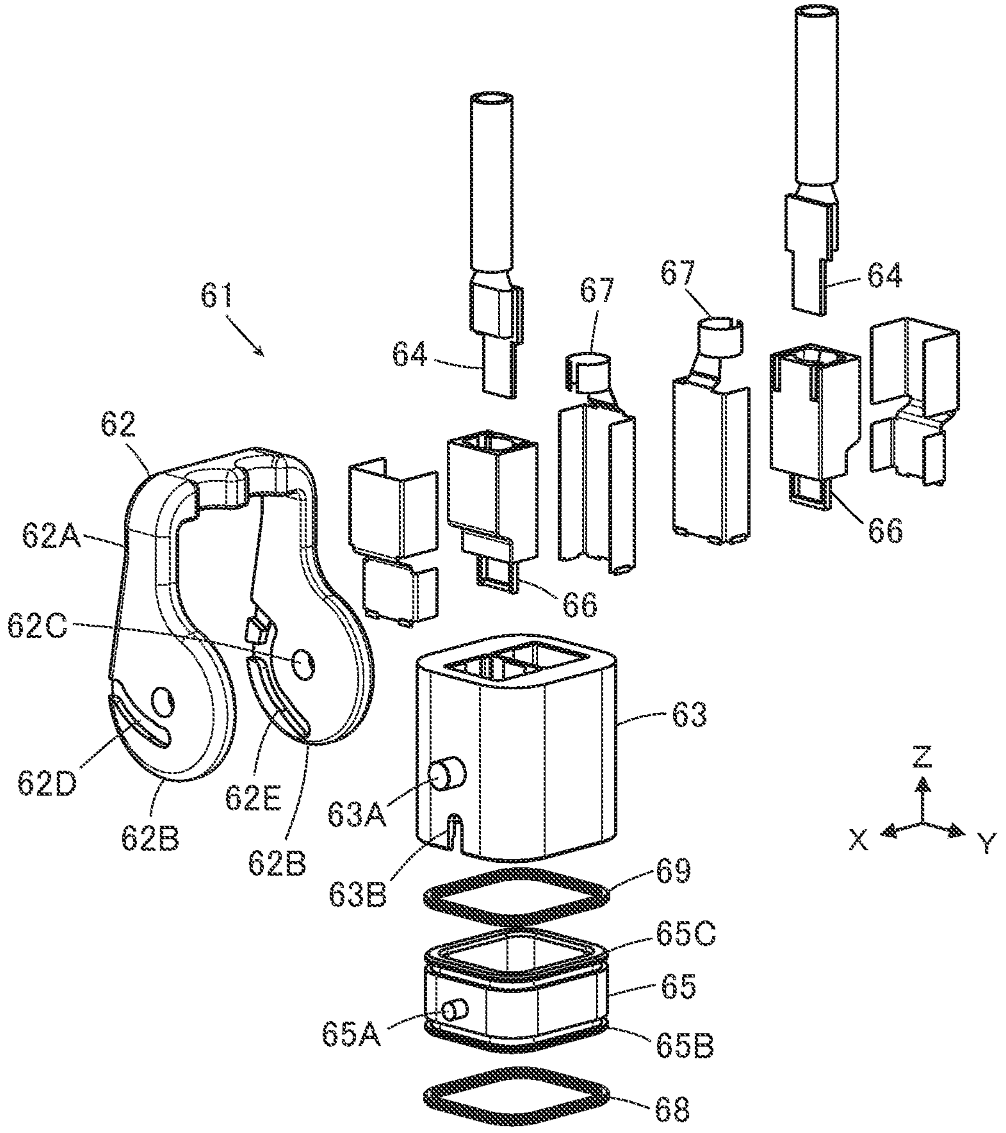
FIG. 27 is an exploded perspective view of a second connector used in Embodiment 3.

FIG. 27 shows an exploded perspective view of the second connector 61. The second connector 61 includes a second insulator 63 having a substantially rectangular cuboid outer shape, a lever member 62 rotatably attached to the second insulator 63, a pair of second contacts 64 separately connected to the ends of the two electric wires C, a second push member 65 having a tubular shape disposed at a lower part of the second insulator 63, and a pair of inner insulators 66 separately housing the pair of second contacts 64.

The second push member 65 is provided at its outer surface with a pair of second pins 65A protruding separately in the +X direction and the −X direction.

The second insulator 63 is provided at its outer surface with a pair of shaft members 63A protruding separately in the +X direction and the −X direction. Further, the second insulator 63 is provided at its outer surface with cutouts 63B which are situated on the −Z direction side from the shaft members 63A and in which the corresponding second pins 65A of the second push member 65 are inserted.

While only the second pin 65A formed on the outer surface of the second push member 65 on the +X direction side and the shaft member 63A and cutout 63B formed on and in the outer surface of the second insulator 63 on the +X direction side are shown in FIG. 27, the same second pin 65A is also formed on the outer surface of the second push member 65 on the −X direction side, and the same shaft member 63A and cutout 63B are also formed on and in the outer surface of the second insulator 63 on the −X direction side. The second pins 65A on the +X direction side and the −X direction side are arranged on one straight line extending along the X direction. The same applies to the two shaft members 63A and the two cutouts 63B.

The lever member 62 includes a handle portion 62A bent in a U-shape, and a pair of circular plate portions 62B separately connected to the opposite ends of the handle portion 62A to face each other in the X direction and extending along a YZ plane. Of the pair of circular plate portions 62B, the outer surfaces facing the opposite directions from each other are each provided with a first cam groove 62D curved in a substantially circular arc shape, and of the pair of circular plate portions 62B, the surfaces facing each other are each provided with a central recess portion 62C and a second cam groove 62E situated outside the central recess portion 62C and curved in a substantially circular arc shape.

While only the first cam groove 62D formed in the circular plate portion 62B on the +X direction side and the central recess portion 62C and second cam groove 62E formed in the circular plate portion 62B on the −X direction side are shown in FIG. 27, the same first cam groove 62D is also formed in the circular plate portion 62B on the −X direction side, and the same central recess portion 62C and second cam groove 62E are also formed in the circular plate portion 62B on the +X direction side. The central recess portions 62C of the circular plate portions 62B on the +X direction side and the −X direction side are arranged on one straight line extending along the X direction. The same applies to the two first cam grooves 62D and the two second cam grooves 62E.

The pair of shaft members 63A of the second insulator 63 are inserted in the central recess portions 62C of the pair of circular plate portions 62B, so that the lever member 62 is held to be rotatable with respect to the second insulator 63.

The pair of first pins 53C of the first insulator 53 are inserted in the first cam grooves 62D of the pair of circular plate portions 62B. Those first cam grooves 62D and first pins 53C constitute a first cam mechanism that moves the first insulator 53 and the second insulator 63 relatively along the Z direction in conjunction with rotation of the lever member 62.

In addition, the pair of second pins 65A of the second push member 65 are inserted in the second cam grooves 62E of the pair of circular plate portions 62B. Those second cam grooves 62E and second pins 65A constitute a second cam mechanism that moves the second push member 65 along the Z direction in conjunction with rotation of the lever member 62.

The second connector 61 further includes two pairs of shells 67, each pair surrounding the corresponding inner insulator 66.

The second push member 65 includes a front portion 65B situated on the −Z direction side from the second pins 65A, and a rear portion 65C situated on the +Z direction side from the second pins 65A. A front waterproof packing 68 is disposed on the outer periphery of the front portion 65B, and a rear waterproof packing 69 is disposed on the outer periphery of the rear portion 65C.

Figure 28:
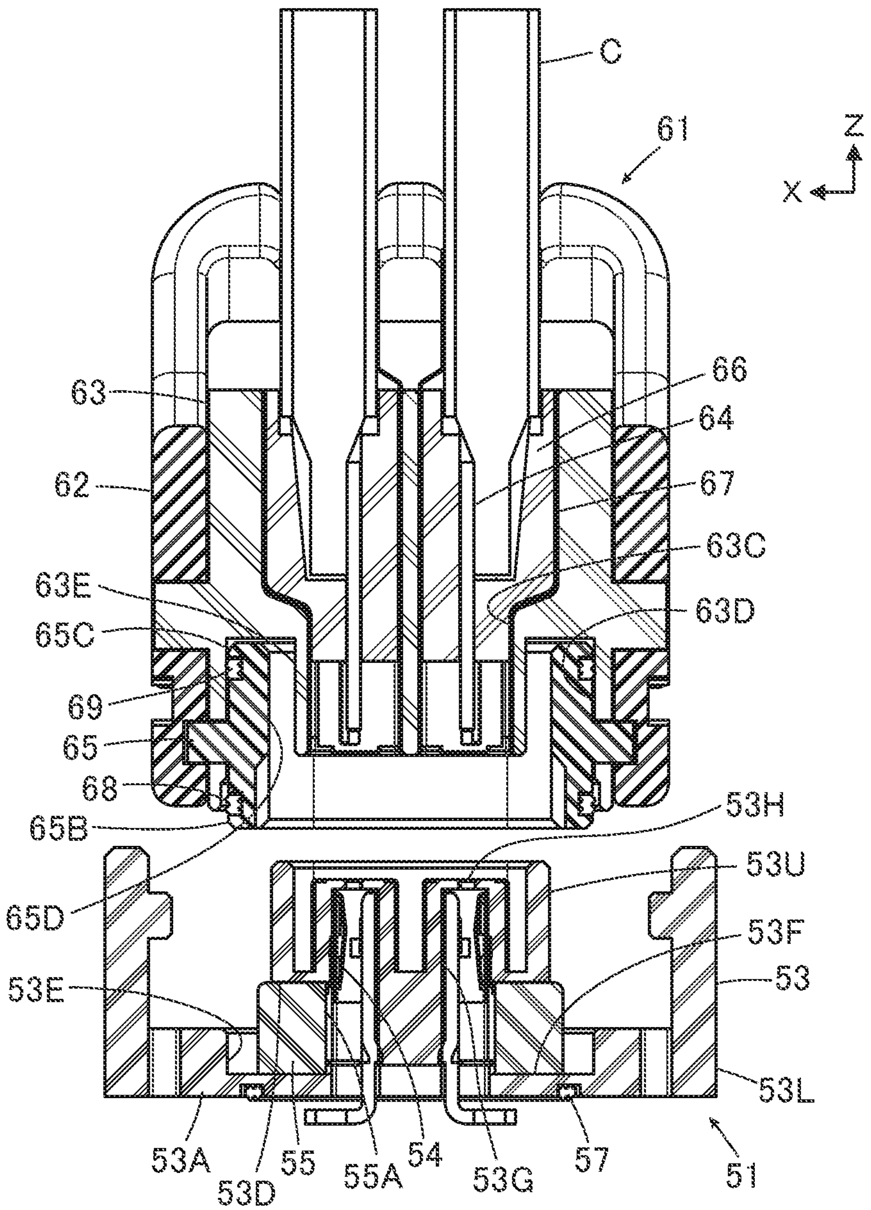
FIG. 28 is a cross-sectional view showing the connector assembly according to Embodiment 3 in the non-fitted state.

As shown in FIG. 28, the second insulator 63 of the second connector 61 is provided with a pair of second contact holding portions 63C of recess shape that are adjacent to each other in the X direction and penetrate the second insulator 63 in the Z direction.

The pair of second contacts 64 connected to the ends of the two electric wires C have a flat plate shape and are each housed in the inner insulator 66 and surrounded by the pair of shells 67; in this state, the pair of second contacts 64 are held in the pair of second contact holding portions 63C. The +Z directional portion of each second contact 64 is housed in and held by the second contact holding portion 63C, and the −Z directional end thereof protrudes in the −Z direction within the second contact holding portion 63C.

The second insulator 63 is provided at its −Z directional end with a rear portion housing portion 63D of recess shape that opens in the −Z direction. The rear portion 65C of the second push member 65 is housed in the rear portion housing portion 63D to be movable in the Z direction.

A first insulator housing portion 63E of recess shape that opens in the −Z direction is formed between the second insulator 63 and the inner peripheral surface of the tubular second push member 65. Of the inner peripheral surface of the second push member 65, the portions facing each other in the X direction form push-out surfaces 65D that push out the first push members 55 of the first connector 51 in the X direction when the first connector 51 and the second connector 61 are fitted to each other.

In the first insulator 53 of the first connector 51, a front portion housing portion 53E of recess shape that opens in the +Z direction is formed by using the base 53A of the lower insulator 53L.

A pair of first push member housing portions 53F of recess shape are each formed between the cutout 53D of the upper insulator 53U and the base 53A of the lower insulator 53L. The pair of first push members 55 are separately housed in the pair of first push member housing portions 53F to be movable in the X direction. The pair of push members 55 are each provided at its +Z directional end with a pushing surface 55A facing the corresponding first contact 54.

The first insulator 53 of the first connector 51 is provided with a pair of first contact housing portions 53G of recess shape disposed adjacent to each other in the X direction and extending in the Z direction. The pair of first contacts 54 are separately housed in the pair of first contact housing portions 53G.

A pair of through-holes 53H communicating with the pair of first contact housing portions 53G are formed on the +Z direction side of the pair of first contact housing portions 53G. The second contacts 64 of the second connector 61 are inserted in the corresponding through-holes 53H when the first connector 51 and the second connector 61 are fitted with each other.

Figure 29:
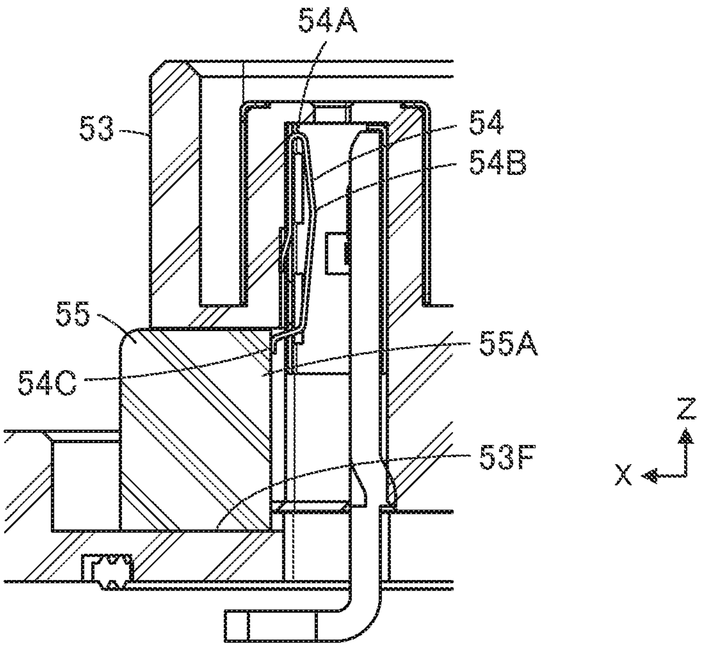
FIG. 29 is an enlarged partial view of FIG. 28.

As shown in FIG. 29, each first contact 54 is formed of a spring contact bent in a U-shape and includes a fulcrum portion 54A formed at the bent part of the U-shape, a contact point portion 54B situated on the −Z direction side from the fulcrum portion 54A, and a point-of-effort portion 54C situated on the −Z direction side from the contact point portion 54B and forming a free end. The contact point portion 54B and the point-of-effort portion 54C are disposed to be elastically displaceable in the X direction with respect to the fulcrum portion 54A. The contact point portion 54B contacts the second contact 64 of the second connector 61 when the first connector 51 and the second connector 61 are fitted with each other, and the point-of-effort portion 54C receives a pushing force from the pushing surface 55A of the first push member 55.

Next, the fitting operation between the first connector 51 and the second connector 61 is described.

Figure 30:
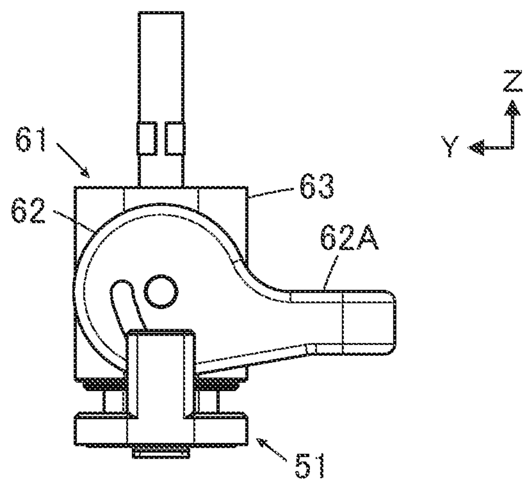
FIG. 30 is a side view showing the connector assembly according to Embodiment 3 when a lever member is at a rotation angle of 0 degrees in fitting operation.
Figure 31:
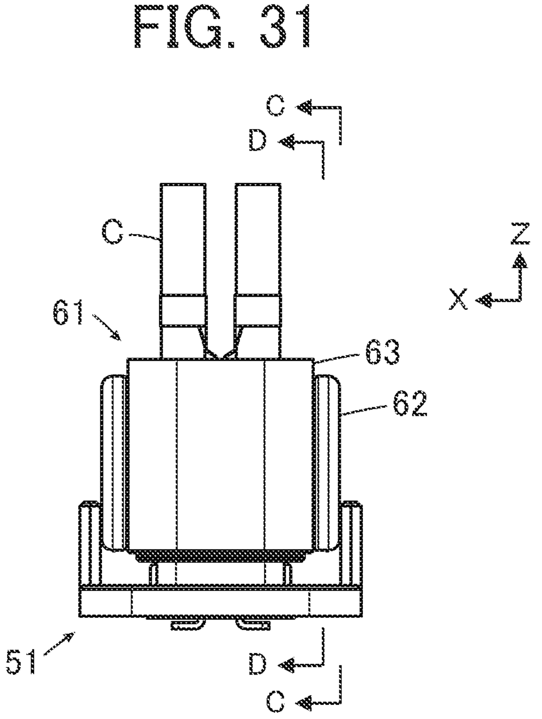
FIG. 31 is a front view showing the connector assembly according to Embodiment 3 when the lever member is at a rotation angle of 0 degrees in fitting operation.

The lever member 62 is set to the initial rotational position with a rotation angle of the lever member 62 of 0 degrees as shown in FIG. 25; in this state, the second connector 61 is moved toward the first connector 51 from the +Z direction to the −Z direction, whereby the +Z directional portion of the first connector 51 is inserted into the interior of the second insulator 63 of the second connector 61 as shown in FIGS. 30 and 31.

Figure 32:
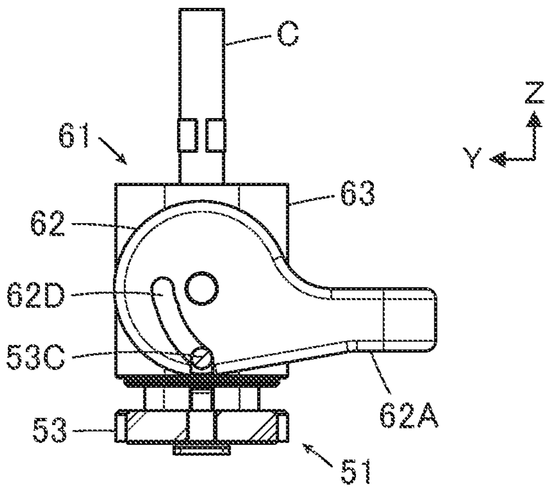
FIG. 32 is a cross-sectional view taken along line C-C in FIG. 31.

As a consequence, the second insulator 63 of the second connector 61 is situated at the fitting start position with respect to the first insulator 53 of the first connector 51, and the first pins 53C of the first connector 51 are inserted in the entrances of the first cam grooves 62D of the lever member 62, as shown in FIG. 32.

Figure 33:
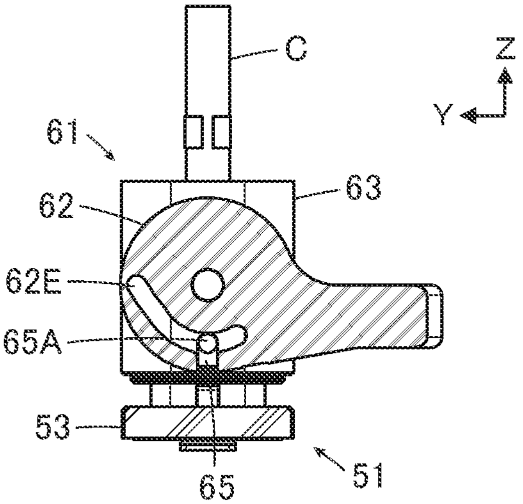
FIG. 33 is a cross-sectional view taken along line D-D in FIG. 31.

Further, the second pins 65A of the second push member 65 of the second connector 61 are inserted in the second cam grooves 62E of the lever member 62 as shown in FIG. 33.

Figure 34:
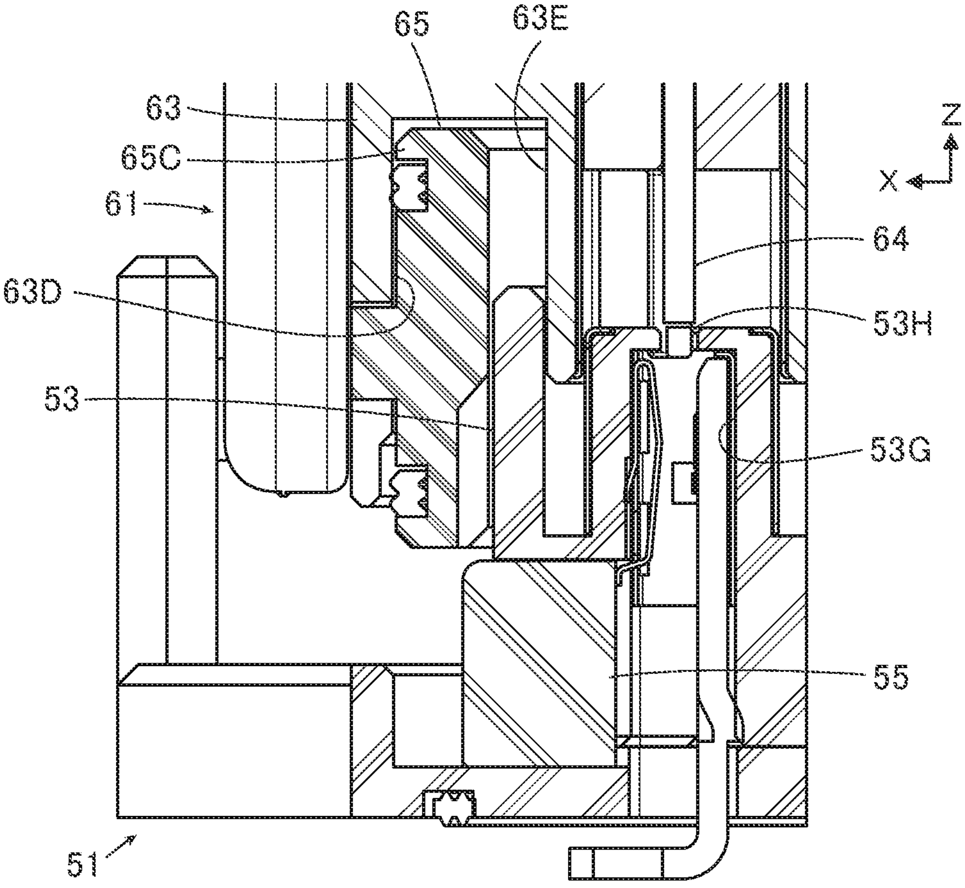
FIG. 34 is an enlarged partial cross-sectional view showing the connector assembly according to Embodiment 3 when the lever member is at a rotation angle of 0 degrees in fitting operation.

At this time, as shown in FIG. 34, the first insulator 53 is inserted up to the middle position, in the Z direction, of the interior of the first insulator housing portion 63E of the second insulator 63, and the second contacts 64 start to be inserted into the first contact housing portions 53G via the through-holes 53H of the first insulator 53.

The push members 55 of the first connector 51 are each situated at a first initial position in the X direction with respect to the first insulator 53, and the pushing surfaces 55A of the first push members 55 are in contact with the point-of-effort portions 54C of the first contacts 54.

On the other hand, the second push member 65 of the second connector 61 is situated at a second initial position where the rear portion 65C is inserted up to the deepest part, on the +Z direction side, of the rear portion housing portion 63D of the second insulator 63.

Figure 35:
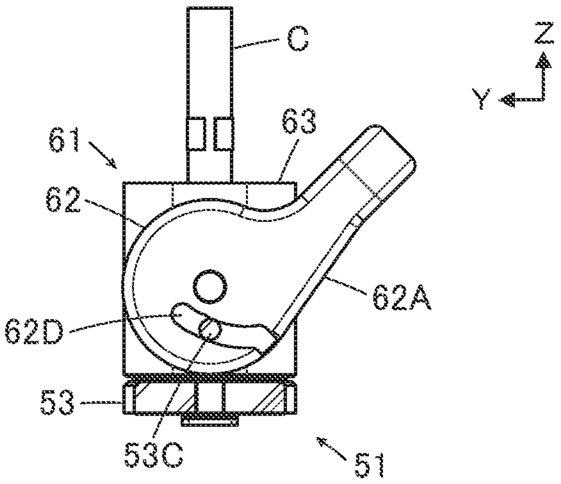
FIG. 35 is a cross-sectional view of the connector assembly according to Embodiment 3 in a cross section corresponding to line C-C of FIG. 31 when the lever member is at a rotation angle of 45 degrees in fitting operation.

When the lever member 62 is rotated to the first rotational position where the handle portion 62A is at an angle of 45 degrees with respect to the Y direction as shown in FIG. 35, the first pins 53C of the first connector 51 relatively move forward along the first cam grooves 62D of the lever member 62, and the second insulator 63 of the second connector 61 moves in the −Z direction with respect to the first insulator 53 of the first connector 51.

Figure 36:
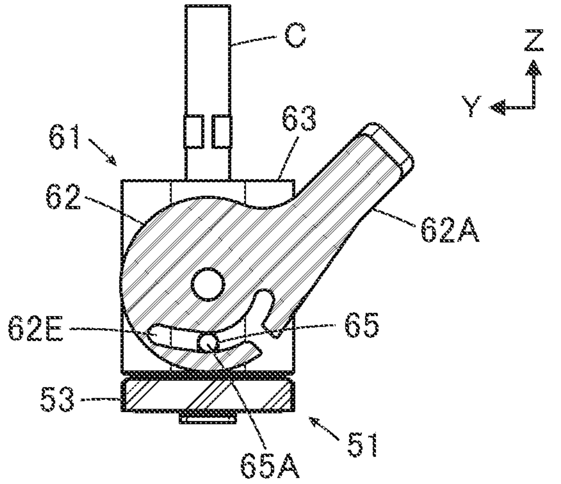
FIG. 36 is a cross-sectional view of the connector assembly according to Embodiment 3 in a cross section corresponding to line D-D of FIG. 31 when the lever member is at a rotation angle of 45 degrees in fitting operation.

Further, the second pins 65A of the second push member 65 of the second connector 61 are inserted up to the middle portions of the second cam grooves 62E of the lever member 62 as shown in FIG. 36.

Figure 37:
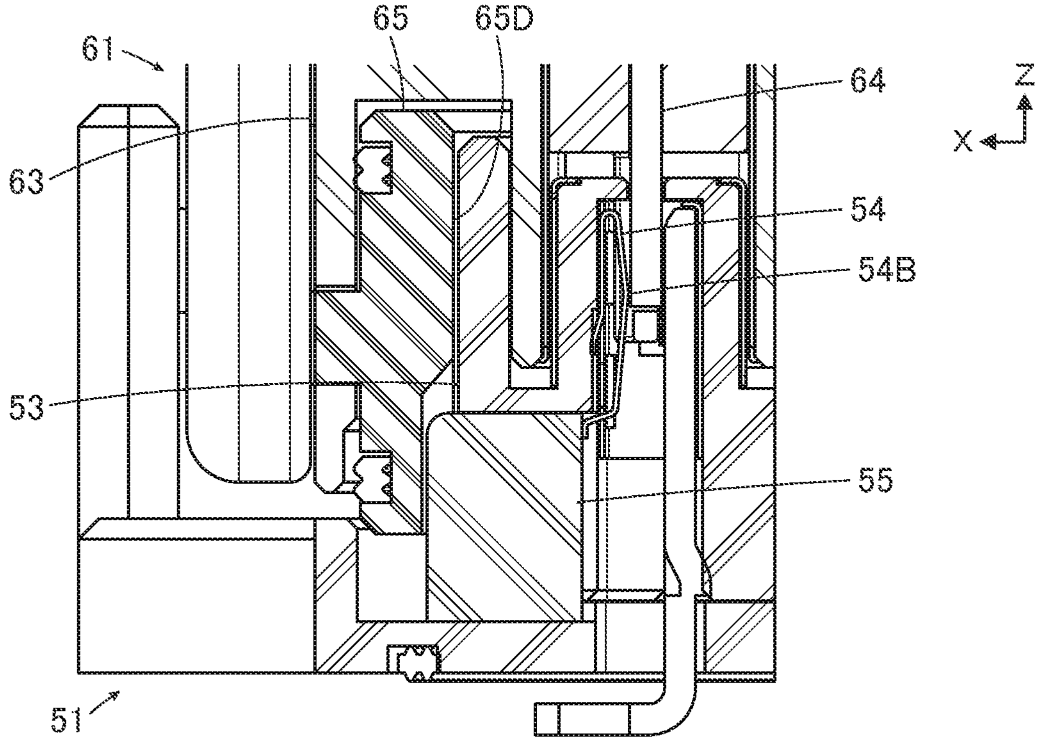
FIG. 37 is an enlarged partial cross-sectional view showing the connector assembly according to Embodiment 3 when the lever member is at a rotation angle of 45 degrees in fitting operation.

Accordingly, as shown in FIG. 37, the second insulator 63 of the second connector 61 moves in the −Z direction with respect to the first insulator 53 of the first connector 51 up to the fitting position, and this allows the lateral surfaces, in the X direction, of the second contacts 64 to face the contact point portions 54B of the first contacts 54.

With the movement of the second insulator 63 with respect to the first insulator 53, the second push member 65 also moves in the −Z direction with respect to the first push members 55 held by the first insulator 53 but keeps the second initial position with respect to the second insulator 63; thus, the push-out surfaces 65D of the second push member 65 do not reach the first push members 55 yet, and the first push members 55 still keep the first initial position with respect to the first insulator 53.

Figure 38:
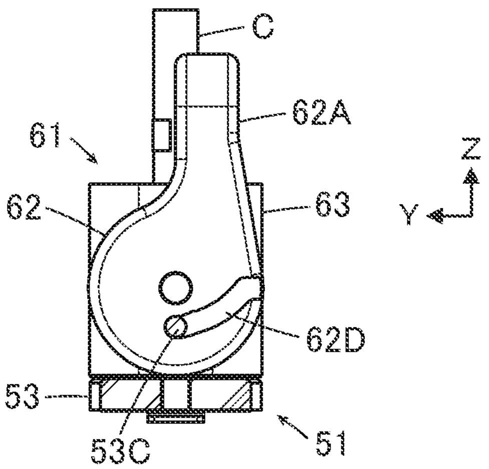
FIG. 38 is a cross-sectional view of the connector assembly according to Embodiment 3 in a cross section corresponding to line C-C of FIG. 31 when the lever member is at a rotation angle of 90 degrees in fitting operation.

From this state, when the lever member 62 is rotated to the second rotational position where the handle portion 62A is at an angle of 90 degrees with respect to the Y direction as shown in FIG. 38, the first pins 53C of the first connector 51 are inserted up to the deepest parts of the first cam grooves 62D of the lever member 62, but the Z-directional position of the second insulator 63 with respect to the first insulator 53 does not change due to the shape of the first cam grooves 62D.

Figure 39:
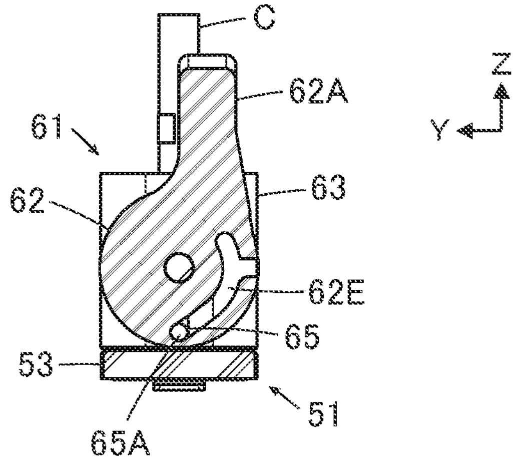
FIG. 39 is a cross-sectional view of the connector assembly according to Embodiment 3 in a cross section corresponding to line D-D of FIG. 31 when the lever member is at a rotation angle of 90 degrees in fitting operation.

Further, the second pins 65A of the second push member 65 are also inserted up to the deepest parts of the second cam grooves 62E of the lever member 62 as shown in FIG. 39.

Figure 40:
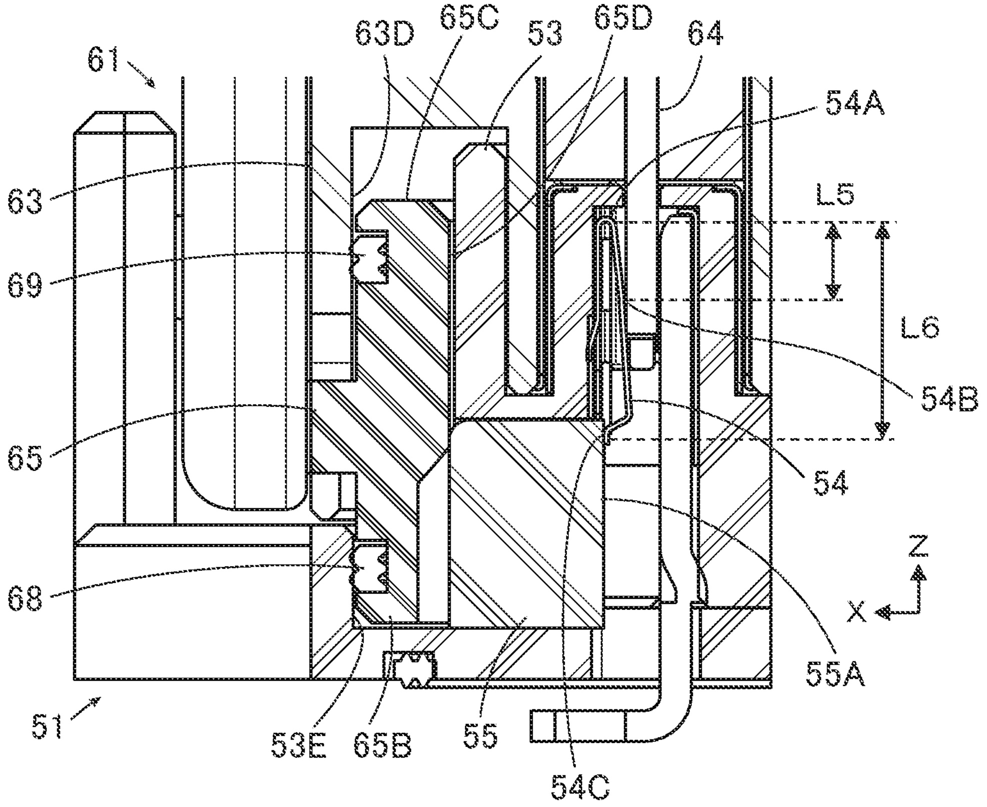
FIG. 40 is an enlarged partial cross-sectional view showing the connector assembly according to Embodiment 3 when the lever member is at a rotation angle of 90 degrees in fitting operation.

Consequently, as shown in FIG. 40, the second push member 65 moves in the −Z direction with respect to the second insulator 63 while the second insulator 63 of the second connector 61 is kept at the fitting position with respect to the first insulator 53 of the first connector 51, and thus, the second push member 65 advances from the second initial position to an advanced position. This allows the push-out surfaces 65D of the second push member 65 to contact the first push members 55 and move the first push members 55 in the X direction from the first initial position to a jutting position. As a result, the pushing surfaces 55A of the first push members 55 push the point-of-effort portions 54C of the first contacts 54 in the X direction.

A distance L6 from the fulcrum portion 54A to the point-of-effort portion 54C in the first contact 54 is set longer than a distance L5 from the fulcrum portion 54A to the contact point portion 54B, and therefore, a force greater than a pushing force that the point-of-effort portion 54C receives from the pushing surface 55A of the first push member 55 acts on the contact point portion 54B due to the so-called principle of leverage, and this allows the contact point portion 54B of the first contact 54 to contact the second contact 64 with high contact pressure.

In addition, a space between the outer periphery of the front portion 65B of the second push member 65 and the inner peripheral surface of the front portion housing portion 53E of the first insulator 53 is sealed owing to the presence of the front waterproof packing 68, and similarly, a space between the outer periphery of the rear portion 65C of the second push member 65 and the inner peripheral surface of the rear portion housing portion 63D of the second insulator 63 is sealed owing to the presence of the rear waterproof packing 69. Thus, water is prevented from entering the connected parts between the first contacts 54 and the second contacts 64 from the outside.

In this manner, when the lever member 62 is rotated from the initial rotational position where the handle portion 62A is at an angle of 0 degrees with respect to the Y direction to the first rotational position where the handle portion 62A is at an angle of 45 degrees with respect to the Y direction, the second insulator 63 of the second connector 61 can be moved from the fitting start position to the fitting position with respect to the first insulator 53 of the first connector 51 while the first push members 55 are held at the first initial position and the second push member 65 is also held at the second initial position such that the pushing surfaces 55A of the first push members 55 do not push the point-of-effort portions 54C of the first contacts 54. Thus, the first connector 51 and the second connector 61 can be easily fitted to each other with a small insertion force.

When the lever member 62 is further rotated from the first rotational position to the second rotational position where the handle portion 62A is at an angle of 90 degrees with respect to the Y direction, the second push member 65 is advanced from the second initial position to the advanced position with respect to the second insulator 63 with the second insulator 63 of the second connector 61 being kept at the fitting position with respect to the first insulator 53 of the first connector 51, and this allows the first push members 55 to move from the first initial position to the jutting position with respect to the first insulator 53, which allows the pushing surfaces 55A of the first push members 55 to push the point-of-effort portions 54C of the first contacts 54 in the X direction, so that the contact point portions 54B of the first contacts 54 can contact the second contacts 64 with high contact pressure.

At this time, since the first contact 54 and the second contact 64 are pressed against each other in the X direction without rubbing together in the Z direction, the first contact 54 and the second contact 64 are electrically connected to each other while their surfaces are prevented from being damaged.

Thus, it is possible to, while easily fitting the first connector 51 and the second connector 61 to each other, establish contact between the first contacts 54 and the second contacts 64 with high contact pressure, thus achieving reliable electric connection, as with Embodiments 1 and 2.

Furthermore, water can be prevented from entering the connected parts between the first contacts 54 and the second contacts 64 from the outside owing to the presence of the front waterproof packing 68 and the rear waterproof packing 69.

Embodiment 4

Figure 41:
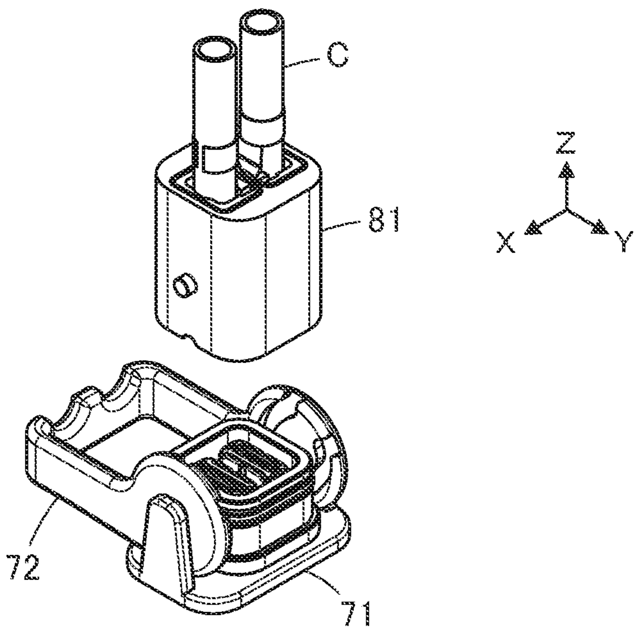
FIG. 41 is a perspective view showing a connector assembly according to Embodiment 4 in the non-fitted state.

FIG. 41 shows a connector assembly according to Embodiment 4 in the non-fitted state. The connector assembly includes a first connector 71 and a second connector 81 to be fitted to the first connector 71 along a fitting direction. The second connector 81 is attached to ends of two electric wires C.

Fitting and detachment between the first connector 71 and the second connector 81 are carried out by operating a lever member 72 rotatably attached to the first connector 71.

For convenience, a direction in which the first connector 71 and the second connector 81 are fitted is defined as "Z direction," a direction of rotation axis of the lever member 72 attached to the first connector 71 as "X direction," and a direction perpendicular to the Z direction and the X direction as "Y direction".

The second connector 81 is moved from the +Z direction toward the −Z direction to be fitted to the first connector 71.

Figure 42:
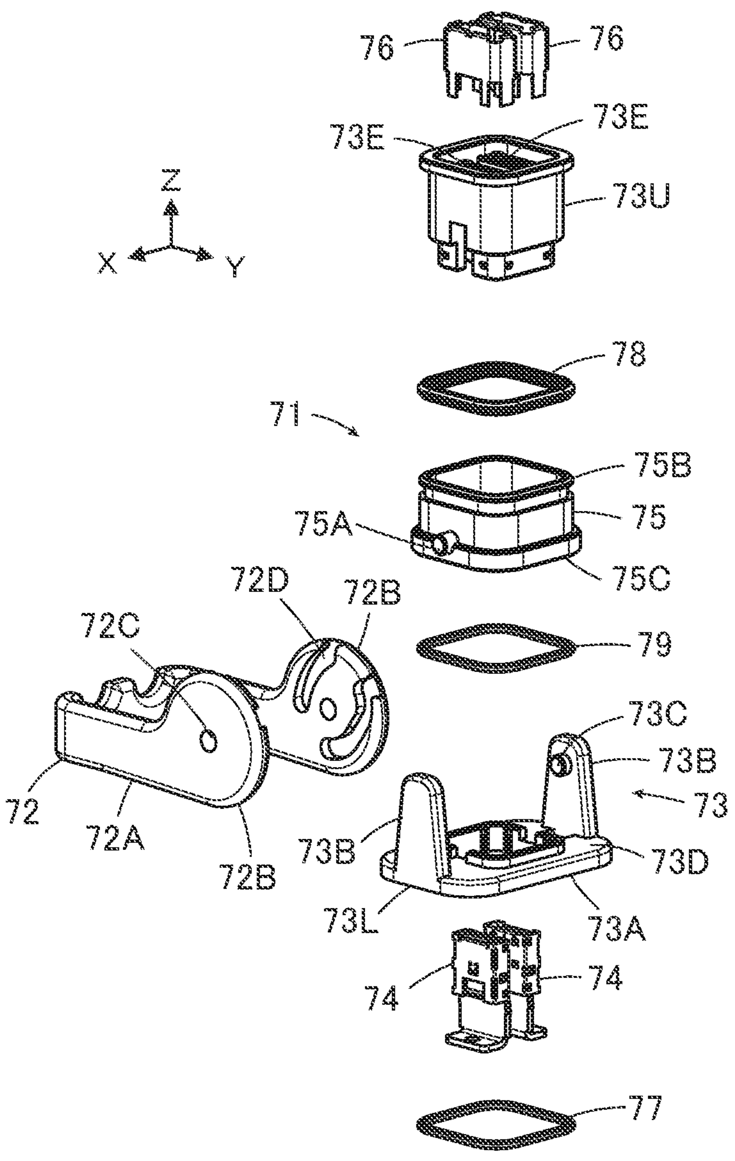
FIG. 42 is an exploded perspective view of a first connector used in Embodiment 4.

FIG. 42 shows an exploded perspective view of the first connector 71. The first connector 71 includes a lower insulator 73L, an upper insulator 73U joined to the lower insulator 73L, a pair of first contacts 74 each held by the upper insulator 73U and extending in the Z direction, and a push member 75 held to be movable in the Z direction along the outer peripheral surface of the upper insulator 73U. The lower insulator 73L and the upper insulator 73U are joined together to form a first insulator 73.

The lower insulator 73L includes a base 73A of flat plate shape extending along an XY plane, and a pair of support portions 73B of flat plate shape that extend in the +Z direction separately from the +X directional end and the −X directional end of the base 73A and face each other in the X direction. A pair of shaft members 73C protruding in the X direction are formed on the opposed surfaces of the pair of support portions 73B. While only the shaft member 73C formed on the support portion 73B on the −X direction side is shown in FIG. 42, the same shaft member 73C is also formed on the support portion 73B on the +X direction side. The two shaft members 73C are arranged on one straight line extending along the X direction.

The surface of the base 73A on the +Z direction side forms an abutment surface 73D.

The upper insulator 73U has a substantially rectangular cuboid outer shape. The upper insulator 73U is provided in its inside with a pair of first contact housing portions, which will be described later, for housing the pair of first contacts 74 and also provided at its +Z directional end with a pair of through-holes 73E communicating with the pair of first contact housing portions.

The lever member 72 includes a handle portion 72A bent in a U-shape, and a pair of circular plate portions 72B separately connected to the opposite ends of the handle portion 72A to face each other in the X direction and extending along a YZ plane. Of the pair of circular plate portions 72B, the outer surfaces facing the opposite directions from each other are each provided with a central recess portion 72C, and of the pair of circular plate portions 72B, the surfaces facing each other are each provided with a first cam groove 72D curved in a substantially circular arc shape and a second cam groove 72E situated on the opposite side from the first cam groove 72D with respect to the center of the circular plate portion 72B and curved in a substantially circular arc shape.

The pair of shaft members 73C of the lower insulator 73L are inserted in the central recess portions 72C of the pair of circular plate portions 72B, so that the lever member 72 is held to be rotatable with respect to the lower insulator 73L.

While only the central recess portion 72C formed in the circular plate portion 72B on the +X direction side and the first cam groove 72D and second cam groove 72E formed on the circular plate portion 72B on the −X direction side are shown in FIG. 42, the same central recess portion 72C is also formed on the circular plate portion 72B on the −X direction side, and the same first cam groove 72D and second cam groove 72E are also formed on the circular plate portion 72B on the +X direction side. The central recess portions 72C of the circular plate portions 72B on the +X direction side and the −X direction side are arranged on one straight line extending along the X direction. The same applies to the two first cam grooves 72D and the two second cam grooves 72E.

The push member 75 has a tubular shape and is provided at its outer surface with a pair of second pins 75A protruding separately in the +X direction and the −X direction. While only the second pin 75A formed on the outer surface of the push member 75 on the +X direction side is shown in FIG. 42, the same second pin 75A is also formed on the outer surface of the push member 75 on the −X direction side. The two second pins 75A are arranged on one straight line extending along the X direction.

The push member 75 includes a front portion 75B situated on the +Z direction side from the second pins 75A, and a rear portion 75C situated on the −Z direction side from the second pins 75A.

The first connector 71 further includes a pair of shells 76 separately surrounding the pair of first contacts 74, and a waterproof packing 77 disposed on the surface of the lower insulator 73L on the −Z direction side.

The first connector 71 further includes a front waterproof packing 78 disposed on the outer periphery of the front portion 75B of the push member 75, and a rear waterproof packing 79 disposed on the rear end surface, which faces in the −Z direction, of the rear portion 75C of the push member 75.

Figure 43:
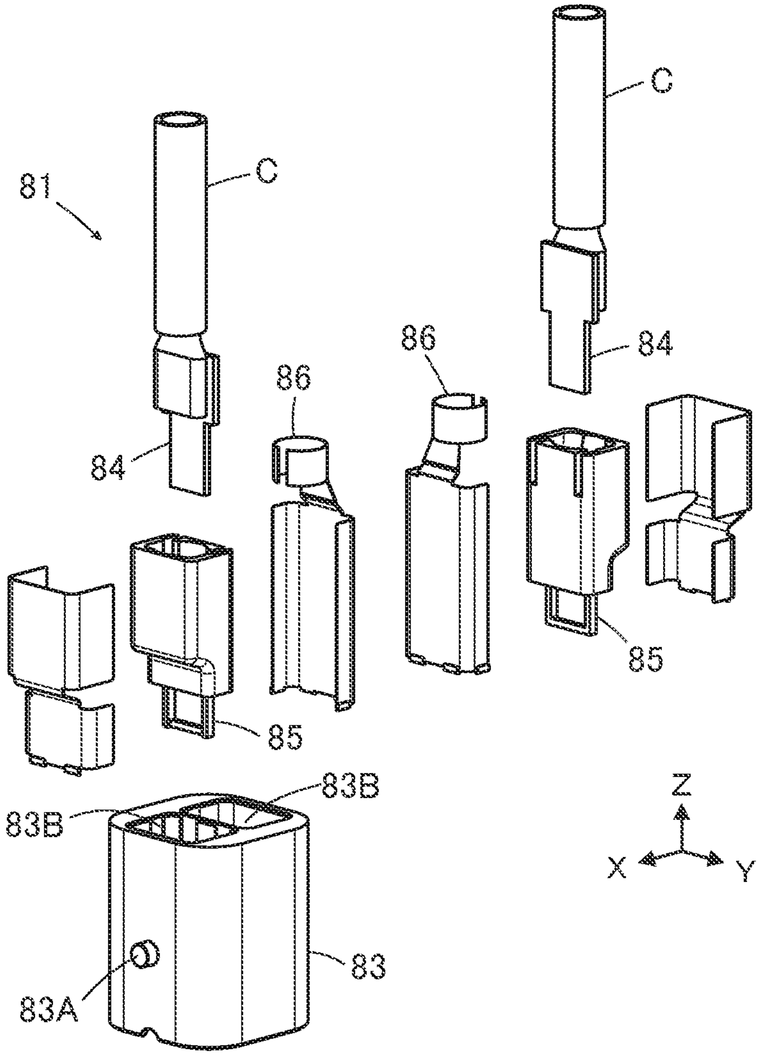
FIG. 43 is an exploded perspective view of a second connector used in Embodiment 4.

FIG. 43 shows an exploded perspective view of the second connector 81. The second connector 81 includes a second insulator 83 having a substantially rectangular cuboid outer shape, a pair of second contacts 84 separately connected to the ends of the two electric wires C, and a pair of inner insulators 85 separately housing the pair of second contacts 84. The second connector 81 further includes two pairs of shells 86, each pair surrounding the corresponding inner insulator 85.

The second insulator 83 is provided at its outer surface with a pair of first pins 83A protruding separately in the +X direction and the −X direction. While only the first pin 83A formed on the outer surface of the second insulator 83 on the +X direction side is shown in FIG. 43, the same first pin 83A is also formed on the outer surface of the second insulator 83 on the −X direction side. The two first pins 83A are arranged on one straight line extending along the X direction.

The second insulator 83 is further provided with a pair of second contact housing portions 83B for housing the pair of second contacts 84, the second contact housing portions 83B penetrating the second insulator 83 in the Z direction.

The pair of first pins 83A of the second insulator 83 are inserted in the first cam grooves 72D of the pair of circular plate portions 72B of the lever member 72. Those first cam grooves 72D and first pins 83A constitute a first cam mechanism that moves the first insulator 73 and the second insulator 83 relatively along the Z direction in conjunction with rotation of the lever member 72.

In addition, the pair of second pins 75A of the push member 75 are inserted in the second cam grooves 72E of the pair of circular plate portions 72B of the lever member 72. Those second cam grooves 72E and second pins 75A constitute a second cam mechanism that moves the push member 75 along the Z direction in conjunction with rotation of the lever member 72.

Next, the fitting operation between the first connector 71 and the second connector 81 is described.

Figure 44:
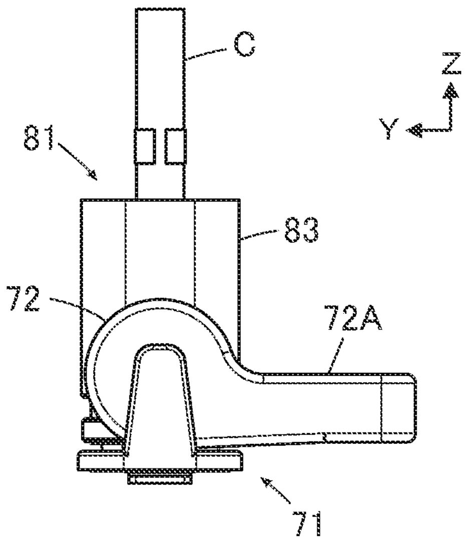
FIG. 44 is a side view showing the connector assembly according to Embodiment 4 when a lever member is at a rotation angle of 0 degrees in fitting operation.
Figure 45:
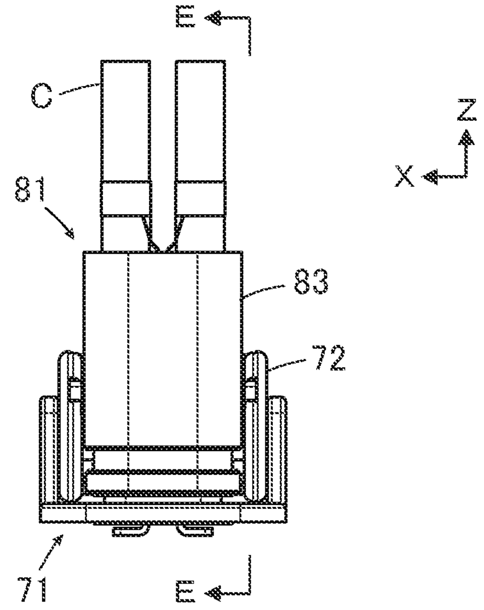
FIG. 45 is a front view showing the connector assembly according to Embodiment 4 when the lever member is at a rotation angle of 0 degrees in fitting operation.

The lever member 72 is set to the initial rotational position with a rotation angle of the lever member 72 of 0 degrees as shown in FIG. 41; in this state, the second connector 81 is moved toward the first connector 71 from the +Z direction to the −Z direction, whereby the +Z directional portion of the first connector 71 is inserted into the interior of the second insulator 83 of the second connector 81 as shown in FIGS. 44 and 45.

Figure 46:
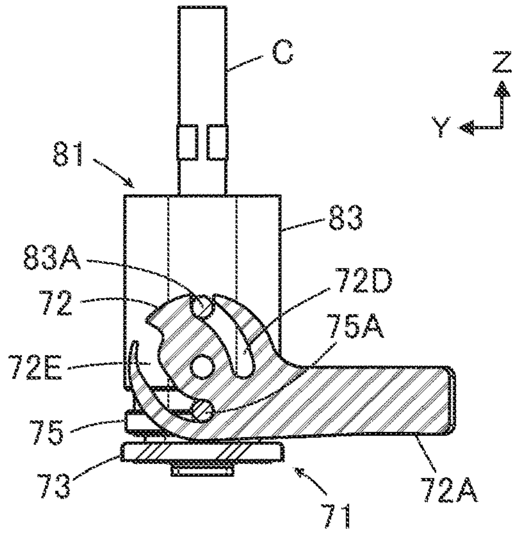
FIG. 46 is a cross-sectional view taken along line E-E in FIG. 45.

As a consequence, the second insulator 83 of the second connector 81 is situated at the fitting start position with respect to the first insulator 73 of the first connector 71 as shown in FIG. 46. The first pins 83A of the second insulator 83 are inserted in the entrances of the first cam grooves 72D of the lever member 72, while the second pins 75A of the push member 75 are inserted in the deepest parts of the second cam grooves 72E of the lever member 72.

Figure 47:
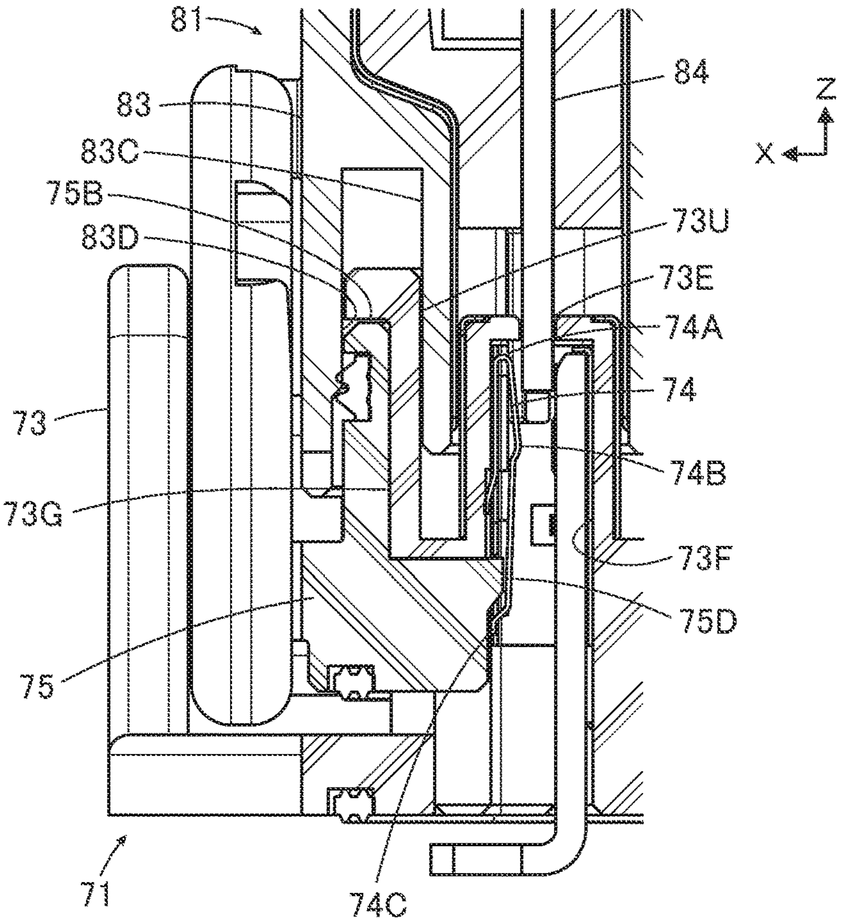
FIG. 47 is an enlarged partial cross-sectional view showing the connector assembly according to Embodiment 4 when the lever member is at a rotation angle of 0 degrees in fitting operation.

At this time, as shown in FIG. 47, the upper insulator 73U of the first connector 71 is inserted up to the middle position, in the Z direction, of the interior of a first insulator housing portion 83C formed at the −Z directional end of the second insulator 83, and the second contacts 84 start to be inserted into first contact housing portions 73F formed inside the upper insulator 73U via the through-holes 73E of the upper insulator 73U.

Each of the first contacts 74 housed in the first contact housing portions 73F is formed of a spring contact bent in a U-shape and includes a fulcrum portion 74A formed at the bent part of the U-shape, a contact point portion 74B situated on the −Z direction side from the fulcrum portion 74A, and a point-of-effort portion 74C situated on the −Z direction side from the contact point portion 74B and forming a free end. At this time, the second contacts 84 do not reach the position where the second contacts 84 face the contact point portions 74B of the first contacts 74 yet.

A front portion housing portion 83D is formed between the inner peripheral surface of the first insulator housing portion 83C of the second insulator 83 and the outer peripheral surface 73G of the upper insulator 73U. The front portion 75B of the push member 75 is housed in the deepest part, on the +Z direction side, of the front portion housing portion 83D, and the push member 75 is situated at the initial position with respect to the first insulator 73. The push member 75 has pushing surfaces 75D protruding in the X direction toward the first contacts 74, and at this time, the pushing surfaces 75D do not contact the point-of-effort portions 74C of the first contacts 74.

Figure 48:
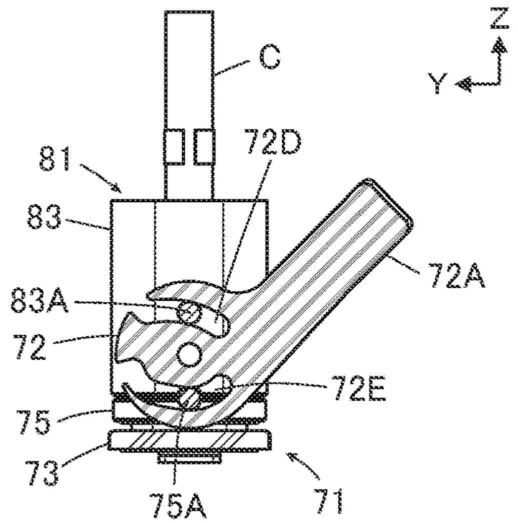
FIG. 48 is a cross-sectional view of the connector assembly according to Embodiment 4 in a cross section corresponding to line E-E of FIG. 45 when the lever member is at a rotation angle of 45 degrees in fitting operation.

When the lever member 72 is rotated to the first rotational position where the handle portion 72A is at an angle of 45 degrees with respect to the Y direction as shown in FIG. 48, the first pins 83A of the second insulator 83 relatively move forward along the first cam grooves 72D of the lever member 72, and the second insulator 83 of the second connector 81 moves in the −Z direction with respect to the first insulator 73 of the first connector 71.

The second pins 75A of the push member 75 move from the deepest parts to the middle parts of the second cam grooves 72E of the lever member 72, but the push member 75 with respect to the first insulator 73 does not change and keeps the initial position due to the shape of the second cam grooves 72E.

Figure 49:
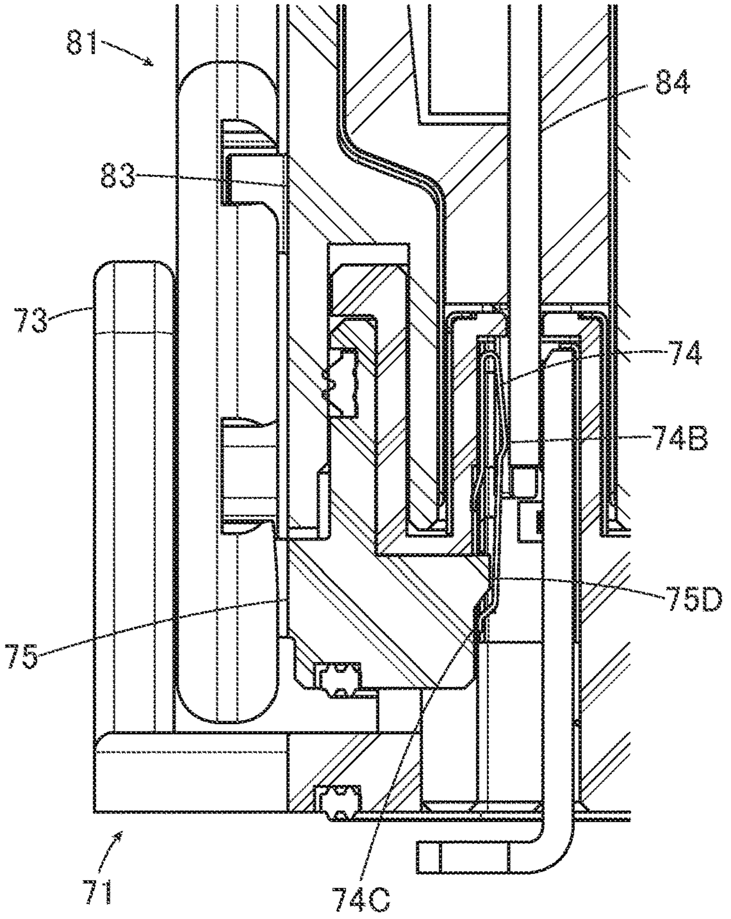
FIG. 49 is an enlarged partial cross-sectional view showing the connector assembly according to Embodiment 4 when the lever member is at a rotation angle of 45 degrees in fitting operation.

Accordingly, as shown in FIG. 49, the second insulator 83 of the second connector 81 moves in the −Z direction with respect to the first insulator 73 of the first connector 71 up to the fitting position, and this allows the lateral surfaces, in the X direction, of the second contacts 84 to face the contact point portions 74B of the first contacts 74.

Further, the push member 75 is held at the initial position with respect to the first insulator 73, and the pushing surfaces 75D of the push member 75 still do not contact the point-of-effort portions 74C of the first contacts 74.

Figure 50:
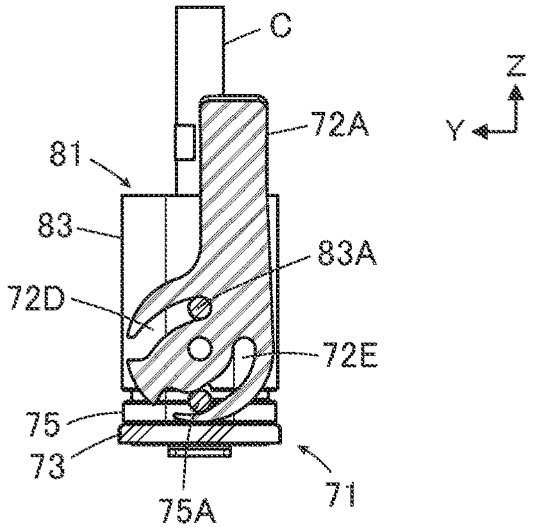
FIG. 50 is a cross-sectional view of the connector assembly according to Embodiment 4 in a cross section corresponding to line E-E of FIG. 45 when the lever member is at a rotation angle of 90 degrees in fitting operation.

From this state, when the lever member 72 is rotated to the second rotational position where the handle portion 72A is at an angle of 90 degrees with respect to the Y direction as shown in FIG. 50, the first pins 83A of the second insulator 83 are inserted up to the deepest parts of the first cam grooves 72D of the lever member 72, but the Z-directional position of the second insulator 83 with respect to the first insulator 73 does not change due to the shape of the first cam grooves 72D.

On the other hand, the second pins 75A of the push member 75 relatively move along the second cam grooves 72E of the lever member 72 toward the entrances thereof, and the push member 75 moves in the −Z direction with respect to the first insulator 73.

Figure 51:
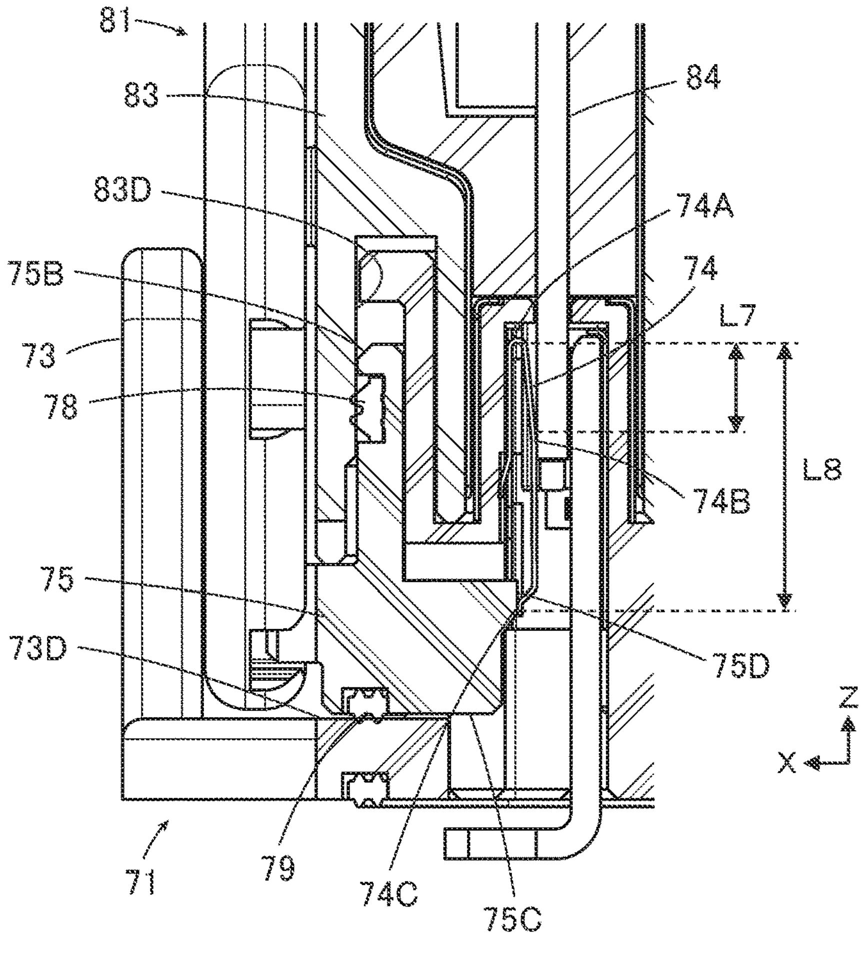
FIG. 51 is an enlarged partial cross-sectional view showing the connector assembly according to Embodiment 4 when the lever member is at a rotation angle of 90 degrees in fitting operation.

Consequently, as shown in FIG. 51, the push member 75 moves in the −Z direction with respect to the first insulator 73 while the second insulator 83 of the second connector 81 is kept at the fitting position with respect to the first insulator 73 of the first connector 71, and thus, the push member 75 retracts from the initial position to the retracted position. When the push member 75 retracts to the retracted position, the rear waterproof packing 79 disposed on the rear end surface, on the −Z direction side, of the rear portion 75C of the push member 75 is pressed against the abutment surface 73D of the first insulator 73, and the pushing surfaces 75D of the push member 75 come to the Z directional position where the pushing surfaces 75D face the point-of-effort portions 74C of the first contacts 74 and push the point-of-effort portions 74 in the X direction.

A distance L8 from the fulcrum portion 74A to the point-of-effort portion 74C in the first contact 74 is set longer than a distance L7 from the fulcrum portion 74A to the contact point portion 74B, and therefore, a force greater than a pushing force that the point-of-effort portion 74C receives from the pushing surface 75D of the push member 75 acts on the contact point portion 74B due to the so-called principle of leverage, and this allows the contact point portion 74B of the first contact 74 to contact the second contact 84 with high contact pressure.

In addition, a space between the outer periphery of the front portion 75B of the push member 75 and the inner peripheral surface of the front portion housing portion 83D of the second insulator 83 is sealed owing to the presence of the front waterproof packing 78, and similarly, a space between the rear end surface of the rear portion 75C of the push member 75 and the abutment surface 73D of the first insulator 73 is sealed owing to the presence of the rear waterproof packing 79. Thus, water is prevented from entering the connected parts between the first contacts 74 and the second contacts 84 from the outside.

In this manner, when the lever member 72 is rotated from the initial rotational position where the handle portion 72A is at an angle of 0 degrees with respect to the Y direction to the first rotational position where the handle portion 72A is at an angle of 45 degrees with respect to the Y direction, the second insulator 83 of the second connector 81 can be moved from the fitting start position to the fitting position with respect to the first insulator 73 of the first connector 71 while the push member 75 is held at the initial position with respect to the first insulator 73 of the first connector 71 such that the pushing surfaces 75D of the push member 75 do not push the point-of-effort portions 74C of the first contacts 74. Thus, the first connector 71 and the second connector 81 can be easily fitted to each other with a small insertion force.

When the lever member 72 is further rotated from the first rotational position to the second rotational position where the handle portion 72A is at an angle of 90 degrees with respect to the Y direction, the push member 75 is retracted from the initial position to the retracted position with respect to the first insulator 73 of the first connector 71 with the second insulator 83 of the second connector 81 being kept at the fitting position with respect to the first insulator 73 of the first connector 71, so that the pushing surfaces 75D of the push member 75 can push the point-of-effort portions 74C of the first contacts 74 in the X direction, thereby allowing the contact point portions 74B of the first contacts 74 to contact the second contacts 84 with high contact pressure.

At this time, since the first contact 74 and the second contact 84 are pressed against each other in the X direction without rubbing together in the Z direction, the first contact 74 and the second contact 84 are electrically connected to each other while their surfaces are prevented from being damaged.

Thus, it is possible to, while easily fitting the first connector 71 and the second connector 81 to each other, establish contact between the first contacts 74 and the second contacts 84 with high contact pressure, thus achieving reliable electric connection, as with Embodiments 1 to 3.

Furthermore, water can be prevented from entering the connected parts between the first contacts 74 and the second contacts 84 from the outside owing to the presence of the front waterproof packing 78 and the rear waterproof packing 79.

Embodiment 5

Figure 52:
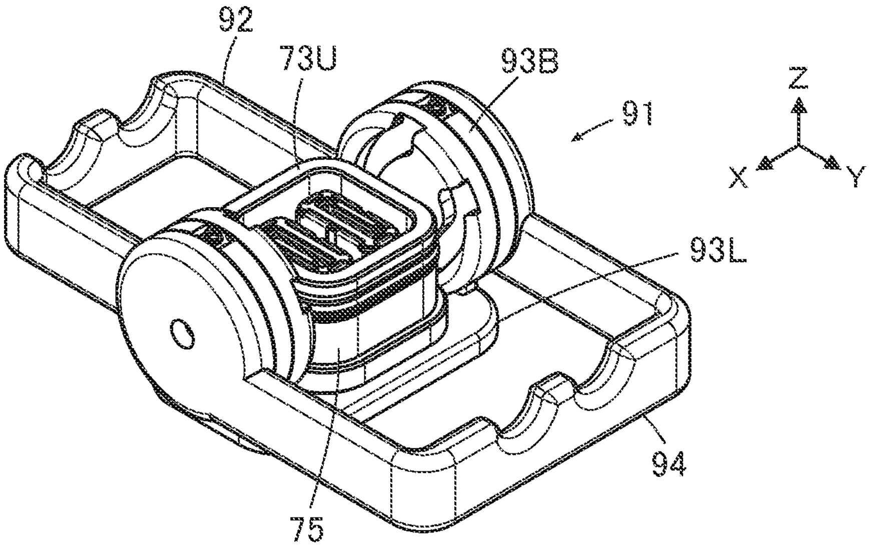
FIG. 52 is a perspective view showing a first connector used in a connector assembly according to Embodiment 5.

FIG. 52 shows a first connector 91 used in a connector assembly according to Embodiment 5. The first connector 91 has the same configuration as the first connector 71 in Embodiment 4 except that, in the first connector 71, the lower insulator 73L is replaced by a lower insulator 93L, and the lever member 72 is replaced by a lever member 92 and an auxiliary lever member 94. Thus, the upper insulator 73U is joined to the lower insulator 93L, and the push member 75 is held to be movable in the Z direction along the outer peripheral surface of the upper insulator 73U.

The lower insulator 93L has the same configuration as the lower insulator 73L used for the first connector 71 in Embodiment 4 except that, in the lower insulator 73L, the pair of support portions 73B are replaced by a pair of circular support portions 93B. While each support portion 73B is provided with one shaft member 73C in the lower insulator 73L, each support portion 93B of the lower insulator 93L has a pair of shaft members (not shown) protruding separately in the +X direction and −X direction in Embodiment 5.

Figure 53:
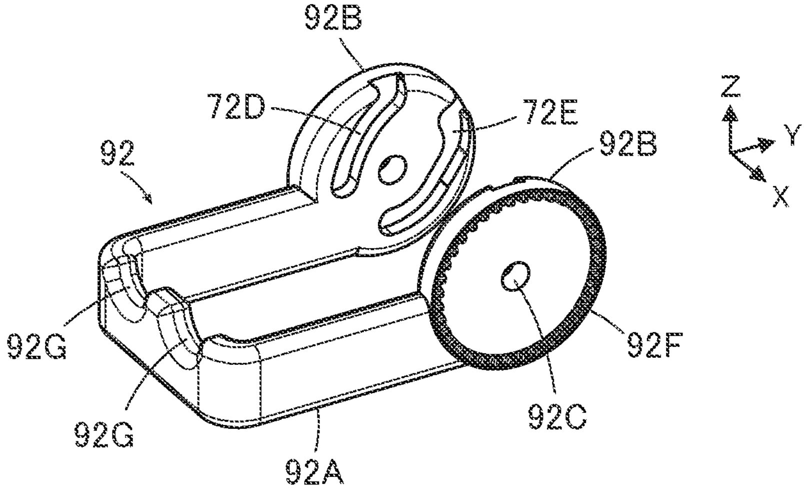
FIG. 53 is a perspective view showing a lever member used in the first connector in Embodiment 5.

As shown in FIG. 53, the lever member 92 includes a handle portion 92A bent in a U-shape, and a pair of circular plate portions 92B separately connected to the opposite ends of the handle portion 92A to face each other in the X direction and extending along a YZ plane. Of the pair of circular plate portions 92B, the outer surfaces facing the opposite directions from each other are each provided with a central recess portion 92C, and of the pair of circular plate portions 92B, the surfaces facing each other are each provided with a first cam groove 72D and a second cam groove 72E that are curved in a substantially circular arc shape. The first cam groove 72D and the second cam groove 72E are the same as those formed in the lever member 72 in Embodiment 4.

Of the pair of circular plate portions 92B, the outer surfaces facing the opposite directions from each other are each further provided with a first gear 92F in which a plurality of teeth protruding in the X direction are circularly arranged along the outer periphery of the circular plate portion 92B.

A pair of electric wire holding portions 92G adjacent to each other in the X direction and recessed in a semicircular shape are formed in the handle portion 92A at the top of the U-shape farthest away from the pair of circular plate portions 92B.

Figure 54:
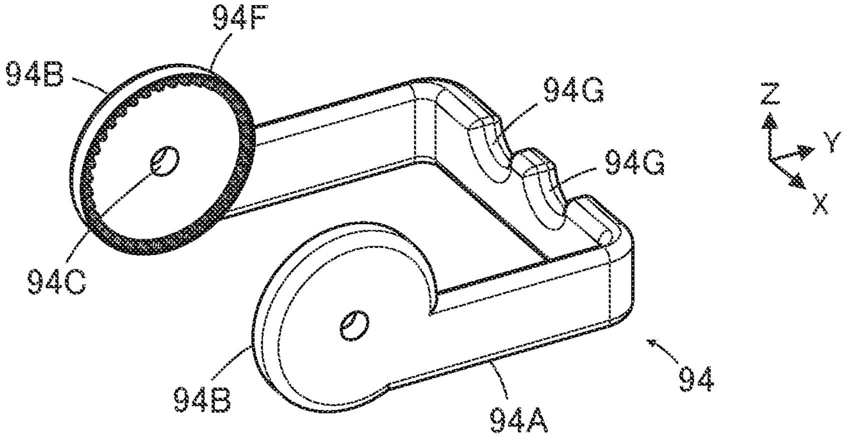
FIG. 54 is a perspective view showing an auxiliary lever member used in the first connector in Embodiment 5.

As shown in FIG. 54, the auxiliary lever member 94 includes a handle portion 94A bent in a U-shape, and a pair of circular plate portions 94B separately connected to the opposite ends of the handle portion 94A to face each other in the X direction and extending along a YZ plane, as with the lever member 92. However, the handle portion 94A is formed to be wider in the X direction than the handle portion 92A of the lever member 92.

Of the pair of circular plate portions 94B, the inner surfaces facing each other are each provided with a central recess portion 94C.

Of the pair of circular plate portions 94B, the inner surfaces facing each other are each further provided with a second gear 94F in which a plurality of teeth protruding in the X direction are circularly arranged along the outer periphery of the circular plate portion 94B. The second gears 94F have the same size and the same arrangement pitch as those of the first gears 92F formed on the pair of circular plate portions 92B of the lever member 92.

A pair of electric wire holding portions 94G adjacent to each other in the X direction and recessed in a semicircular shape are formed in the handle portion 94A at the top of the U-shape farthest away from the pair of circular plate portions 94B.

The pair of shaft members (not shown) protruding separately in the +X direction and −X direction from each of the pair of support portions 93B of the lower insulator 93L are correspondingly inserted into the central recess portions 92C of the pair of circular plate portions 92B of the lever member 92 and the central recess portions 94C of the pair of circular plate portions 94B of the auxiliary lever member 94, whereby the lever member 92 and the auxiliary lever member 94 are held to be rotatable with respect to the lower insulator 93L. The pair of circular plate portions 92B of the lever member 92 are disposed on the inner side from the pair of support portions 93B of the lower insulator 93L, and the pair of circular plate portions 94B of the auxiliary lever member 94 are disposed on the outer side from the pair of support portions 93B of the lower insulator 93L.

Figure 55:
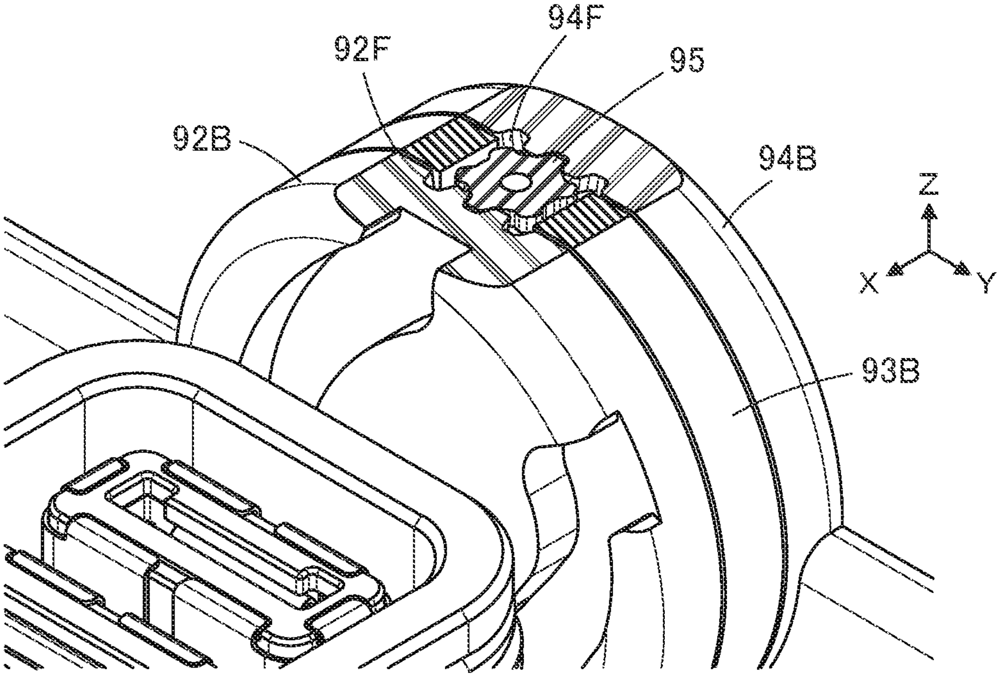
FIG. 55 is a partially broken perspective view showing the first connector in Embodiment 5.

An intermediate gear 95 is attached at the +Z directional end of the support portion 93B to be rotatable in an XY plane around the central axis extending in the Z direction, as shown in FIG. 55. The intermediate gear 95 meshes with both the first gear 92F of the circular plate portion 92B of the lever member 92 disposed on one of the opposite sides, in the X direction, of the support portion 93B and the second gear 94F of the circular plate portion 94B of the auxiliary lever member 94 disposed on the other of the opposite sides, in the X direction, of the support portion 93B, and this constitutes a lever linkage mechanism that rotates the auxiliary lever member 94 in the opposite direction from the direction of rotation of the lever member 92 in conjunction with the rotating operation of the lever member 92.

Figure 56:
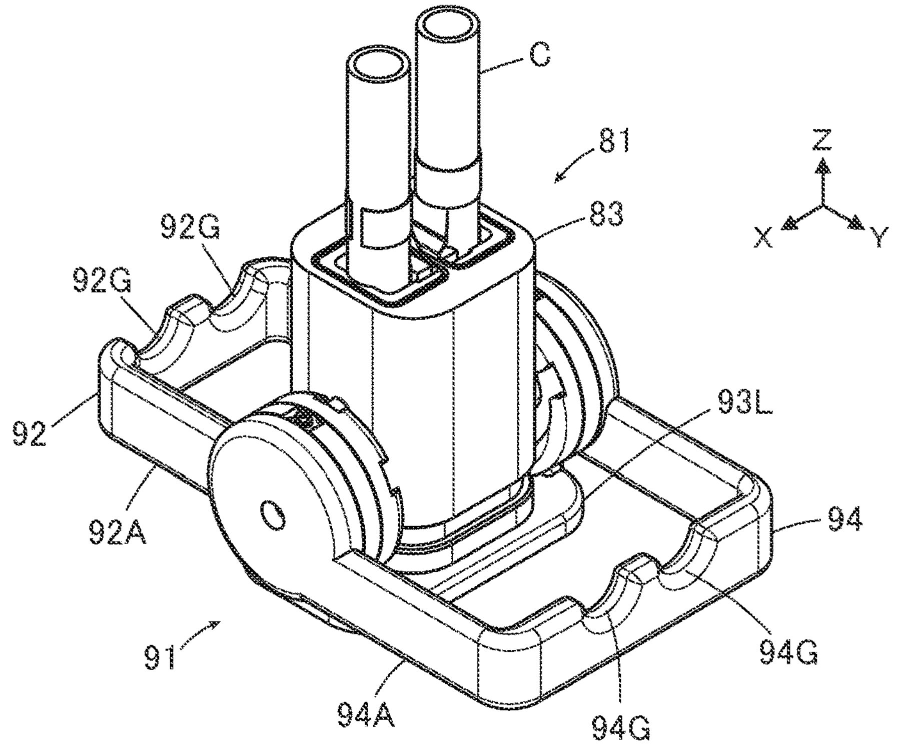
FIG. 56 is a perspective view showing the connector assembly according to Embodiment 5 when the lever member is at a rotation angle of 0 degrees in fitting operation.

As shown in FIG. 56, the lever member 92 and the auxiliary lever member 94 are configured such that the auxiliary lever member 94 is to have a rotation angle of 0 degrees on the +Y direction side of the lower insulator 93L when the lever member 92 is placed to the initial rotational position with a rotation angle of the lever member 92 of 0 degrees on the −Y direction side of the lower insulator 93L.

Figure 57:
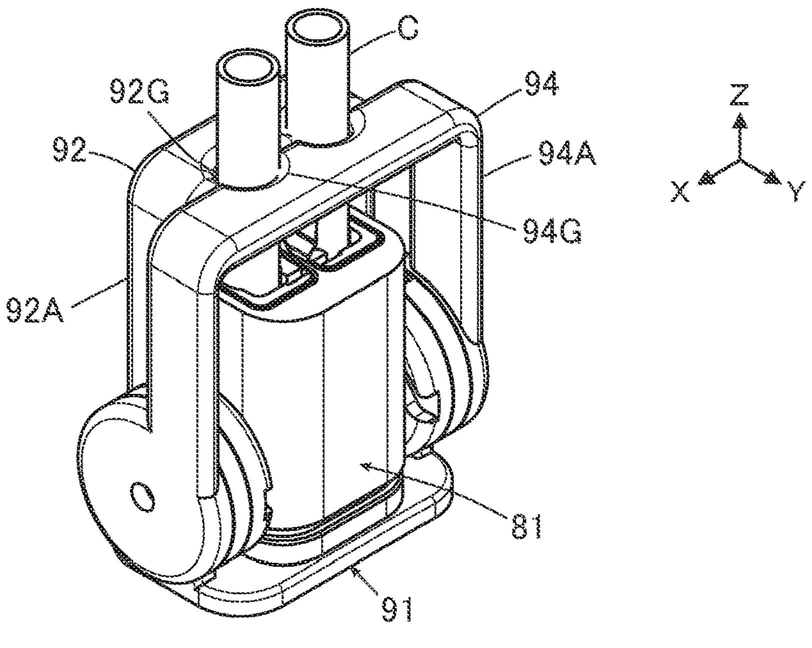
FIG. 57 is a perspective view showing the connector assembly according to Embodiment 5 when the lever member is at a rotation angle of 90 degrees in fitting operation.
Figure 58:
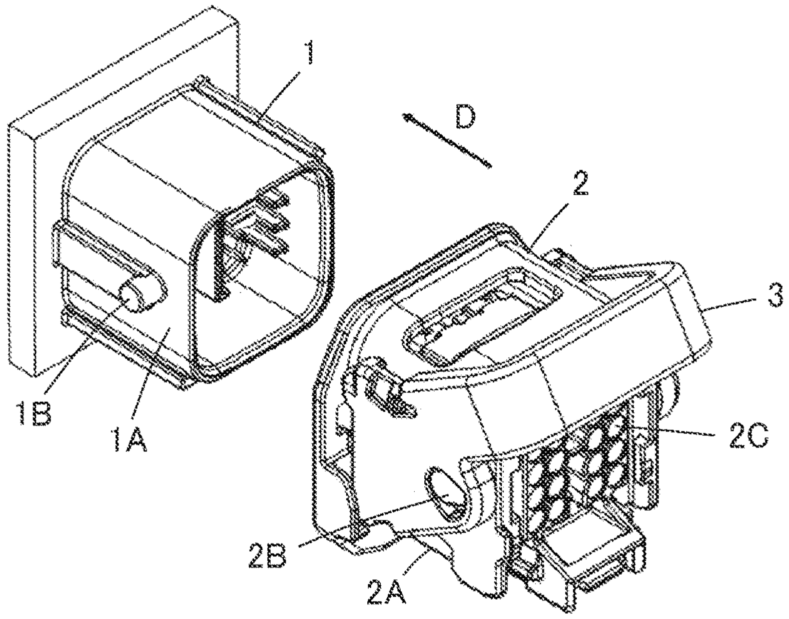
FIG. 58 PRIOR ART
FIG. 58 is a perspective view showing a conventional connector assembly in the non-fitted state.
Figure 59:
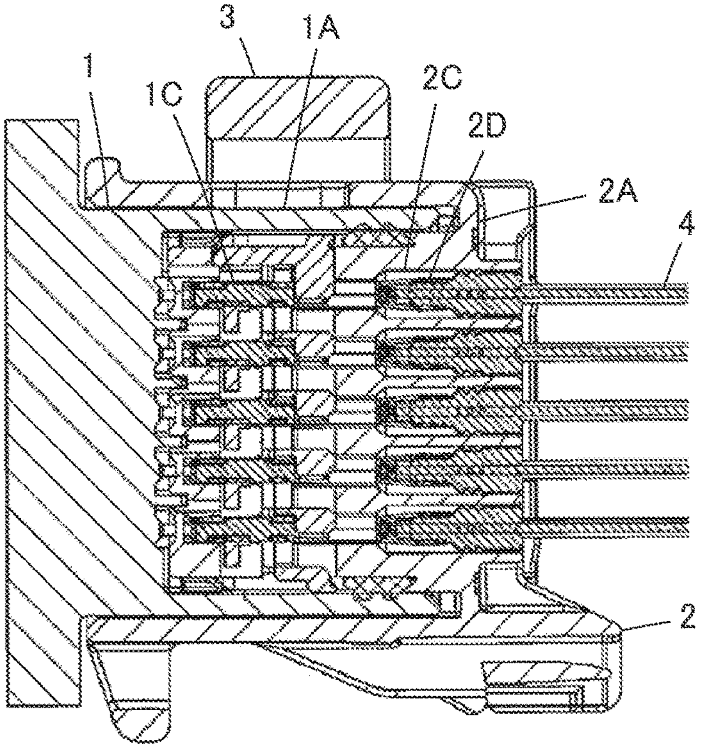
FIG. 59 PRIOR ART
FIG. 59 is a cross-sectional view of the conventional connector assembly in a fitted state.

In the state where the second insulator 83 of the second connector 81 is situated at the fitting start position with respect to the first connector 91, when the lever member 92 is rotated to the second rotational position where the handle portion 92A is at an angle of 90 degrees with respect to the Y direction as shown in FIG. 57, the first connector 91 and the second connector 81 are fitted to each other so that reliable electric connection is established therebetween. Simultaneously with this, the auxiliary lever member 94 is also rotated to a rotation angle of 90 degrees with respect to the Y direction by the lever linkage mechanism.

Consequently, the two electric wires C connected to the second connector 81 are sandwiched between the electric wire holding portions 92G of semicircular shape formed in the handle portion 92A of the lever member 92 and the electric wire holding portions 94G of semicircular shape formed in the handle portion 94A of the auxiliary lever member 94 and thereby held by the lever member 92 and the auxiliary lever member 94.

Therefore, it is possible to restrict movement of the two electric wires C connected to the second connector 81 fitted to the first connector 91 even when an external force such as vibration acts on an electric device on which the first connector 91 is mounted.

The first gear 92F of the circular plate portion 92B of the lever member 92 and the second gear 94F of the circular plate portion 94B of the auxiliary lever member 94 may be configured to directly mesh with each other without the intermediate gear 95 such that the second gear 94F is rotated in conjunction with rotation of the first gear 92F.

While, in Embodiments 1 to 5 above, the initial rotational position, the first rotational position, and the second rotational position of the lever member 22, 42, 62, 72, 92 are defined to correspond to rotation angles of the lever member 22, 42, 62, 72, 92 of 0 degrees, 45 degrees, and 90 degrees, respectively, the invention is not limited thereto, and those rotational positions may be defined to correspond to other rotational angles.

What is claimed is:

1. A connector assembly comprising:

a first connector including a first insulator and a first contact held by the first insulator;

a second connector including a second insulator and a second contact held by the second insulator, the second connector being fitted to the first connector along a fitting direction;

a lever member rotatably held by one of the first insulator and the second insulator;

a push member held to be movable with respect to the first insulator and including a pushing surface used to press the first contact and the second contact against each other;

a first cam mechanism moving the first insulator and the second insulator relatively along the fitting direction in conjunction with rotation of the lever member; and a second cam mechanism moving the push member in conjunction with rotation of the lever member, wherein in a state where the second insulator is situated at a fitting start position with respect to the first insulator, when the lever member is rotated from an initial rotational position to a first rotational position, the second insulator is moved to a fitting position along the fitting direction by the first cam mechanism, and when the lever member is further rotated from the first rotational position to a second rotational position, the push member is moved with respect to the first insulator by the second cam mechanism such that the first contact and the second contact come into contact with each other at a predetermined contact pressure by the pushing surface of the push member with the second insulator being kept at the fitting position.

2. The connector assembly according to claim 1, wherein the first contact and the second contact extend along the fitting direction, one of the first contact and the second contact is formed of a spring contact, and the other thereof is formed of a fixed contact, and the push member moved by the second cam mechanism pushes the spring contact toward the fixed contact in a direction intersecting the fitting direction, whereby the first contact and the second contact come into contact with each other.

3. The connector assembly according to claim 2, wherein the spring contact includes a point-of-effort portion that contacts the push member and receives a pushing force from the push member, a fulcrum portion that serves as a fulcrum of elastic deformation of the spring contact when the point-of-effort portion receives the pushing force, and a contact point portion that is disposed between the point-of-effort portion and the fulcrum portion and contacts the fixed contact, and a distance from the fulcrum portion to the point-of-effort portion is larger than a distance from the fulcrum portion to the contact point portion.

4. The connector assembly according to claim 2, wherein the push member is held to be movable along the fitting direction between an initial position and a withdrawn position with respect to the first insulator and includes the pushing surface used to press the first contact and the second contact against each other when the push member is at the initial position, and when the lever member is rotated from the initial rotational position to the first rotational position, the push member is moved from the initial position to the withdrawn position by the second cam mechanism, and when the lever member is further rotated from the first rotational position to the second rotational position, the push member is moved from the withdrawn position to the initial position by the second cam mechanism such that the pushing surface allows the first contact and the second contact to be pressed against each other.

5. The connector assembly according to claim 4, wherein the second contact is formed of the spring contact, and when the lever member is rotated from the initial rotational position to the first rotational position, the push member is moved from the initial position to the withdrawn position by the second cam mechanism, and when the lever member is rotated from the first rotational position to the second rotational position, the push member is moved from the withdrawn position to the initial position by the second cam mechanism such that the pushing surface allows the second contact to be pressed against the first contact.

6. The connector assembly according to claim 4, wherein the lever member is rotatably held by the second insulator, the first cam mechanism includes a first cam groove formed in the lever member and a first pin formed to protrude from the first insulator and inserted in the first cam groove, and the second cam mechanism includes a second cam groove formed in the lever member and a second pin formed to protrude from the push member and inserted in the second cam groove.

7. The connector assembly according to claim 6, wherein the first connector includes a spring used to hold the push member at the initial position, and when the lever member is rotated from the initial rotational position to the first rotational position, the push member is moved from the initial position to the withdrawn position by the second cam mechanism against an elastic force of the spring.

8. The connector assembly according to claim 2, wherein the push member is held to be movable along the fitting direction between an initial position and a retracted position with respect to the first insulator and includes the pushing surface used to press the first contact and the second contact against each other when the push member is at the retracted position, and the push member is held at the initial position during rotation of the lever member from the initial rotational position to the first rotational position, and when the lever member is rotated from the first rotational position to the second rotational position, the push member is moved from the initial position to the retracted position by the second cam mechanism such that the pushing surface allows the first contact and the second contact to be pressed against each other.

9. The connector assembly according to claim 8, wherein the first contact is formed of the spring contact, and the push member is held at the initial position during rotation of the lever member from the initial rotational position to the first rotational position, and when the lever member is rotated from the first rotational position to the second rotational position, the push member is moved from the initial position to the withdrawn position by the second cam mechanism such that the pushing surface allows the first contact to be pressed against the second contact.

10. The connector assembly according to claim 8, wherein the lever member is rotatably held by the second insulator, the first cam mechanism includes a cam groove formed in the lever member and a first pin formed to protrude from the first insulator and inserted in the cam groove, and the second cam mechanism includes a peripheral cam surface formed on the lever member and a second pin formed to protrude from the push member and contacting the peripheral cam surface.

11. The connector assembly according to claim 10, wherein the first connector includes a spring used to hold the push member at the initial position, and the push member is held at the initial position by the spring during rotation of the lever member from the initial rotational position to the first rotational position, and when the lever member is rotated from the first rotational position to the second rotational position, the push member is moved from the initial position to the retracted position by the second cam mechanism against an elastic force of the spring.

12. The connector assembly according to claim 2, wherein the push member includes a first push member held to be movable along a direction perpendicular to the fitting direction between a first initial position and a jutting position with respect to the first insulator and a second push member held to be movable along the fitting direction between a second initial position and an advanced position with respect to the second insulator, the first push member includes the pushing surface used to press the first contact and the second contact against each other when the first push member is at the jutting position, the second push member includes a push-out surface used to push out the first push member to the jutting position when the second push member is at the advanced position, and the first push member is held at the first initial position and the second push member is held at the second initial position during rotation of the lever member from the initial rotational position to the first rotational position, and when the lever member is rotated from the first rotational position to the second rotational position, the second push member is moved from the second initial position to the advance position by the second cam mechanism such that the push-out surface moves the first push member from the first initial position to the jutting position, whereby the pushing surface of the first push member allows the first contact and the second contact to be pressed against each other.

13. The connector assembly according to claim 12, wherein the first contact is formed of the spring contact, and when the lever member is rotated from the first rotational position to the second rotational position, the first push member is moved from the first initial position to the jutting position such that the pushing surface allows the first contact to be pressed against the second contact.

14. The connector assembly according to claim 12, wherein the lever member is rotatably held by the second insulator, the first cam mechanism includes a first cam groove formed in the lever member and a first pin formed to protrude from the first insulator and inserted in the first cam groove, and the second cam mechanism includes a second cam groove formed in the lever member and a second pin formed to protrude from the second push member and inserted in the second cam groove.

15. The connector assembly according to claim 14, wherein the second push member includes a front portion situated closer to the first connector than the second pin in the fitting direction and a rear portion situated on an opposite side from the first connector with respect to the second pin in the fitting direction, the first insulator includes a front portion housing portion of recess shape in which the front portion is housed to be movable along the fitting direction, the second insulator includes a rear portion housing portion of recess shape in which the rear portion is housed to be movable along the fitting direction, and the connector assembly includes a front waterproof packing disposed on an outer peripheral surface of the front portion to seal a space between the outer peripheral surface of the front portion and an inner peripheral surface of the front portion housing portion, and a rear waterproof packing disposed on an outer peripheral surface of the rear portion to seal a space between the outer peripheral surface of the rear portion and an inner peripheral surface of the rear portion housing portion.

16. The connector assembly according to claim 8, wherein the lever member is rotatably held by the first insulator, the first cam mechanism includes a first cam groove formed in the lever member and a first pin formed to protrude from the second insulator and inserted in the first cam groove, and the second cam mechanism includes a second cam groove formed in the lever member and a second pin formed to protrude from the push member and inserted in the second cam groove.

17. The connector assembly according to claim 16, wherein the push member includes a front portion situated closer to the second connector than the second pin in the fitting direction and a rear portion situated on an opposite side from the second connector with respect to the second pin in the fitting direction, the second insulator includes a front portion housing portion of recess shape in which the front portion is housed to be movable along the fitting direction, the first insulator includes an abutment surface that abuts on a rear end surface of the rear portion when the push member is at the retracted position, and the connector assembly includes a front waterproof packing disposed on an outer peripheral surface of the front portion to seal a space between the outer peripheral surface of the front portion and an inner peripheral surface of the front portion housing portion, and a rear waterproof packing disposed on the rear end surface of the rear portion to seal a space between the rear end surface of the rear portion and the abutment surface when the push member is at the retracted position.

18. The connector assembly according to claim 16, comprising an auxiliary lever member rotatably held by the first insulator and a lever linkage mechanism that rotates the auxiliary lever member in an opposite direction from a direction of rotation of the lever member in conjunction with rotating operation of the lever member, wherein the second contact is connected to an end of an electric wire, and the electric wire is sandwiched between the lever member and the auxiliary lever member and thereby held by the lever member and the auxiliary lever member when the lever member is at the second rotational position.

19. The connector assembly according to claim 18, wherein the lever linkage mechanism includes a first gear formed on the lever member and a second gear formed on the auxiliary lever member to rotate with rotation of the first gear.

20. The connector assembly according to claim 19, wherein the lever linkage mechanism includes an intermediate gear rotatably disposed on the lever member to mesh with both the first gear and the second gear.

* * * * *